(12) United States Patent
Suzuki et al.

(10) Patent No.: US 12,247,639 B2
(45) Date of Patent: Mar. 11, 2025

(54) TOOTHED BELT AND BELT TRANSMISSION MECHANISM

(71) Applicant: Mitsuboshi Belting Ltd., Kobe (JP)

(72) Inventors: Norihito Suzuki, Hyogo (JP); Masakuni Yoshida, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/288,343

(22) PCT Filed: Apr. 21, 2022

(86) PCT No.: PCT/JP2022/018492
§ 371 (c)(1),
(2) Date: Oct. 25, 2023

(87) PCT Pub. No.: WO2022/230762
PCT Pub. Date: Nov. 3, 2022

(65) Prior Publication Data
US 2024/0200635 A1    Jun. 20, 2024

(30) Foreign Application Priority Data

Apr. 27, 2021 (JP) ................. 2021-075222
Jul. 2, 2021 (JP) ................. 2021-110816
Apr. 14, 2022 (JP) ................. 2022-066929

(51) Int. Cl.
*F16G 1/28*     (2006.01)
*F16H 7/02*     (2006.01)

(52) U.S. Cl.
CPC ............... *F16G 1/28* (2013.01); *F16H 7/023* (2013.01)

(58) Field of Classification Search
CPC ..... F16G 1/28; F16G 1/10; F16G 5/20; F16G 1/08; F16H 7/023; F16H 7/02
(Continued)

(56) References Cited

U.S. PATENT DOCUMENTS 3,989,868 A * 11/1976 Bell ................. F16G 1/28
156/137
4,048,865 A * 9/1977 Bell ................. F16G 1/28
525/154
(Continued)

FOREIGN PATENT DOCUMENTS

JP    2000-193040 A    7/2000
JP    6096239 B2       3/2017
(Continued)

OTHER PUBLICATIONS

Jul. 19, 2022—International Search Report—Intl App PCT/JP2022/018492.
(Continued)

*Primary Examiner* — Henry Y Liu
(74) *Attorney, Agent, or Firm* — Banner & Witcoff, Ltd.

(57) ABSTRACT

A toothed belt includes: a back portion; at least one tension member embedded in the back portion; tooth portions arranged at a predetermined interval along a belt longitudinal direction on one surface of the back portion; and a tooth cloth covering a surface of the tooth portion and a part of the one surface of the back portion, in which the at least one tension member is a twisted cord including a high-strength glass fiber filament, a tooth pitch, a diameter of the at least one tension member, and a ratio of a thickness of the back portion to a thickness of the toothed belt are in a specific range, the tooth portion is constituted of a rubber composition, a hardness of the rubber composition at 23° C. is 73° or more and 83° or less, and the tooth portion has a specific shape.

8 Claims, 8 Drawing Sheets

(58) Field of Classification Search
USPC .......................................................... 474/205
See application file for complete search history.

(56) References Cited

U.S. PATENT DOCUMENTS

| | | | | |
|---|---|---|---|---|
| 4,264,314 | A * | 4/1981 | Imamura | F16G 5/20 |
| | | | | 474/205 |
| 4,276,039 | A * | 6/1981 | Takano | F16G 5/08 |
| | | | | 474/267 |
| 4,392,842 | A * | 7/1983 | Skura | F16G 1/28 |
| | | | | 474/205 |
| 4,632,665 | A * | 12/1986 | Skura | B29D 29/08 |
| | | | | 474/205 |
| 4,721,496 | A * | 1/1988 | Yokoyama | F16G 5/20 |
| | | | | 474/263 |
| 4,776,828 | A * | 10/1988 | Mashimo | B29D 29/08 |
| | | | | 474/260 |
| 5,234,387 | A * | 8/1993 | Fujiwara | C08K 5/3415 |
| | | | | 474/205 |
| 5,599,246 | A * | 2/1997 | Fujiwara | C08K 5/103 |
| | | | | 474/271 |
| 5,853,849 | A * | 12/1998 | Nishio | B32B 3/10 |
| | | | | 474/84 |
| 6,220,983 | B1 * | 4/2001 | Osako | D02G 3/447 |
| | | | | 474/263 |
| 6,485,384 | B1 * | 11/2002 | Ochiai | F16H 7/023 |
| | | | | 474/204 |
| 6,605,014 | B2 * | 8/2003 | Isshiki | F16G 1/28 |
| | | | | 474/263 |
| 10,641,355 | B2 * | 5/2020 | Nishiyama | F16G 1/10 |
| 11,326,665 | B2 * | 5/2022 | Ozaki | F16G 1/00 |
| 2006/0063627 | A1 * | 3/2006 | Tomobuchi | F16G 1/28 |
| | | | | 474/260 |
| 2006/0079362 | A1 * | 4/2006 | Tomobuchi | F16G 1/28 |
| | | | | 474/260 |
| 2008/0318719 | A1 * | 12/2008 | Izu | F16G 1/28 |
| | | | | 474/205 |
| 2010/0120566 | A1 * | 5/2010 | Izu | F16G 1/28 |
| | | | | 474/205 |
| 2011/0118068 | A1 * | 5/2011 | Mitsutomi | F16G 1/10 |
| | | | | 474/205 |
| 2011/0129647 | A1 * | 6/2011 | Duke, Jr. | D06M 15/568 |
| | | | | 428/296.4 |
| 2011/0237374 | A1 * | 9/2011 | Nakao | F16G 1/08 |
| | | | | 474/205 |
| 2012/0252619 | A1 * | 10/2012 | Uchigashima | F16G 1/10 |
| | | | | 474/205 |
| 2013/0059690 | A1 * | 3/2013 | Di Cesare | F16G 1/28 |
| | | | | 474/205 |
| 2014/0080647 | A1 * | 3/2014 | Sakamoto | F16G 1/28 |
| | | | | 474/205 |
| 2014/0206487 | A1 * | 7/2014 | Tomobuchi | C08J 5/046 |
| | | | | 474/205 |
| 2015/0111677 | A1 * | 4/2015 | Nishiyama | F16G 5/08 |
| | | | | 474/264 |
| 2016/0040749 | A1 * | 2/2016 | Kageyama | B32B 3/30 |
| | | | | 474/8 |
| 2016/0208889 | A1 * | 7/2016 | Yoshida | B32B 5/02 |
| 2016/0221637 | A1 * | 8/2016 | Osaki | F16H 7/02 |
| 2016/0377149 | A1 * | 12/2016 | Furusawa | F16G 1/10 |
| | | | | 474/205 |
| 2017/0029578 | A1 * | 2/2017 | Wu | D06M 15/564 |
| 2017/0051810 | A1 * | 2/2017 | Ideguchi | F16G 1/08 |
| 2017/0108079 | A1 * | 4/2017 | Shakushiro | F16G 1/16 |
| 2019/0315898 | A1 * | 10/2019 | Casagrande | C08K 7/14 |
| 2020/0049230 | A1 * | 2/2020 | Suzuki | F16G 1/28 |
| 2020/0116230 | A1 * | 4/2020 | Tamura | B29D 29/08 |
| 2020/0200232 | A1 * | 6/2020 | Ozaki | F16G 1/28 |
| 2021/0018063 | A1 * | 1/2021 | Noborikawa | D03D 15/217 |
| 2021/0054904 | A1 * | 2/2021 | Tamura | F16G 1/28 |

FOREIGN PATENT DOCUMENTS

| | | |
|---|---|---|
| JP | 6324336 B2 | 5/2018 |
| JP | 2018-165514 A | 10/2018 |
| JP | 6641513 B2 | 2/2020 |
| JP | 6748131 B2 | 8/2020 |

OTHER PUBLICATIONS

Aug. 30, 2022—(JP) Office Action—App 2022-066929.
Dec. 13, 2022—(JP) Office Action—App 2022-066929.
Dec. 15, 2022—(TW) Office Action—App 111115960.
Jan. 31, 2023—(JP) Office Action—App 2022-066929.

* cited by examiner

H-TOOTH SHAPE

H2M

BELT WIDTH DIRECTION

S2.5M

TOOTHED BELT AND BELT TRANSMISSION MECHANISM

CROSS REFERENCE TO RELATED APPLICATIONS

This is a U.S. National Phase Application under 35 U.S.C. § 371 of International Application No. PCT/JP2022/018492, filed Apr. 21, 2022, which claims priority to Japanese Application Nos. 2021-075222, filed Apr. 27, 2021; 2021-110816, filed Jul. 2, 2021; and 2022-066929, filed Apr. 14, 2022, which were published Under PCT Article 21 (2), the entire contents of which are incorporated herein by reference.

TECHNICAL FIELD

The present invention relates to a toothed belt and, for example, to a toothed belt and a belt power-transmission system applied to a driving device of an electric power slide door (PSD) system.

BACKGROUND ART

The electric power slide door (PSD) system (hereinafter referred to as a PSD system) is a system for electrically opening and closing a slide door of a passenger vehicle (such as a one-box car or a wagon vehicle). In the PSD system, a driving device (actuator) including a driving source (driving motor) is provided at a vehicle floor portion or a vehicle side portion, and the slide door is opened and closed via a tensile strength member (a wire cable or a belt).

Recently, in order to meet demands such as reduction in size and weight, power saving, quietness (reduction in operating noise), and high output of a driving motor (increase in driving torque associated with an increase in door weight) of a device in accordance with diversification of user needs and vehicle types to be adopted, a PSD system in which a type of a speed reduction system (first stage) provided in a driving device is changed from a gear type to a belt type has been adopted in various vehicle types including a slide door from a light automatic vehicle to a normal automatic vehicle.

A belt-type speed reduction system provided in the driving device includes a driving pulley provided in a unit (housing) of the device and connected to a rotary shaft (rotatable forward and backward) of a driving motor, a driven pulley connected to a driven shaft and having a larger diameter than the driving pulley, and a toothed belt of a relatively small size (for example, tooth pitch of about 2 mm to 3 mm) wound endlessly between the two pulleys. A center distance between the pulleys is relatively short (for example, about 50 mm), and the shafts of the pulleys are fixed. Therefore, in order to facilitate assembly (attachment of belt) to a device, the toothed belt is wound around the pulleys in a non-tension state (installation tension of zero) (see FIG. 2).

CITATION LIST

Patent Literature

Patent Literature 1: Japanese Patent No. 6096239
Patent Literature 2: Japanese Patent No. 6641513
Patent Literature 3: Japanese Patent No. 6748131
Patent Literature 4: JP2018-165514A
Patent Literature 5: Japanese Patent No. 6324336

SUMMARY OF INVENTION

Technical Problem (Problem 1)

A PSD system is required to have not only a function of opening and closing the slide door electrically but also a function (manual operability) of smoothly opening and closing the slide door manually to the same extent as operability in a vehicle not equipped with the PSD system.

In particular, recently, a region in which vehicles equipped with the PSD system are used has been expanded with diversification of vehicle types equipped with the PSD system, and it is necessary to assume use in frigid regions (continent and the like) (see Patent Literature 1 in which a toothed belt having a cold resistance is described). Therefore, it is required that the bendability (flexibility and winding property to a pulley) of the belt wound around the pulleys in a non-tension state (installation tension of zero) is not excessively reduced and the manual operability of the slide door is not affected even in an extremely low temperature environment (−30° C. to −40° C.).

Specifically, it is required that in a small-sized toothed belt which is applied to a driving device (belt-type speed reduction system) of a PSD system and which is wound in a non-tension state, the bendability (flexibility and winding property to a pulley) can be ensured even in an extremely low temperature environment, and even in the case where the slide door is manually opened and closed in an extremely low temperature environment, a starting torque of a driven pulley provided in the belt-type speed reduction system is ensured at a sufficiently low level.

That is, it is required to further improve the bendability of the belt as compared with a belt in the related art designed without considering the use in an extremely low temperature environment (−30° C. to −40° C.), and to ensure the starting torque of the driven pulley provided in the belt-type speed reduction system at a lower level, as compared with the case where the toothed belt in the related art is applied to the speed reduction system, in the case where the slide door is manually opened and closed in an extremely low temperature environment.

(Problem 2)

Further, it is required that, in a small-sized toothed belt which is applied to a driving device (belt-type speed reduction system) of a PSD system and which is wound in a non-tension state, the power-transmission performance (non-occurrence of tooth jumping and the like) can be ensured even in the case where the driving motor is driven in a state in which the torque thereof is increased (for example, increased from about 0.8 N·m in the related art to about 1.5 N·m) by an amount corresponding to an increase in the weight (load) of the slide door in accordance with diversification of vehicle types in which the PSD system is adopted.

That is, it is required to ensure the power-transmission performance (tooth jumping resistance and the like) of the belt at a higher level as compared with a belt in the related art designed to cope with a relatively low driving motor torque (for example, about 0.8 N·m).

Accordingly, an object of the present invention is to provide a toothed belt and a belt power-transmission system that can ensure the power-transmission performance of the belt while ensuring the bendability of the belt under an extremely low temperature environment even when being wound around pulleys in a non-tension state.

Solution to Problem

The present invention is directed to a toothed belt including:
a back portion;
at least one tension member embedded in the back portion;
a plurality of tooth portions arranged at a predetermined interval along a belt longitudinal direction on one surface of the back portion; and
a tooth cloth covering a surface of the tooth portion and a part of the one surface of the back portion, in which
the at least one tension member is a twisted cord including a high-strength glass fiber filament,
a tooth pitch between the tooth portions is 2.0 mm or more and 2.5 mm or less,
a diameter of the at least one tension member is 0.15 mm or more and less than 0.30 mm,
a ratio of a thickness of the back portion to a thickness of the toothed belt is 22.0% or more and 38.5% or less,
the tooth portion is constituted of a rubber composition,
a hardness of the rubber composition at 23° C. is 73° or more and 83° or less, and
the tooth portion has a shape where a tooth tip portion and two side surfaces sandwiching the tooth tip portion in the belt longitudinal direction are joined together with one or two or more curved surfaces having a fixed curvature.

The tension member is a twisted cord including a high-strength glass fiber filament, so that a predetermined belt elastic modulus is ensured in the toothed belt, and both the bendability of the toothed belt and the power-transmission performance (particularly, impact load resistance) of the toothed belt can be implemented.

In addition, a numerical value of the tooth pitch, which is an interval between belt teeth (plurality of tooth portions) adjacent to each other in the belt longitudinal direction, corresponds to a scale of the belt teeth (length of the belt teeth in the belt longitudinal direction and tooth height of the belt teeth). That is, as a numerical value of the tooth pitch becomes larger, the scale of the belt tooth becomes larger in a similar manner, and by setting the tooth pitch in a range of 2.0 mm or more and 2.5 mm or less, it is possible to easily implement both the bendability of the belt under an extremely low temperature environment and the power-transmission performance (tooth jumping resistance and the like) even when being wound around the pulleys in a non-tension state.

In addition, by setting the diameter of the tension member in a range of 0.15 mm or more and less than 0.30 mm, the bendability of the belt under an extremely low temperature environment can be ensured.

In addition, by reducing the ratio of the thickness of the back portion to the thickness of the toothed belt (back thickness ratio) to a relatively low level of 22.0% or more and 38.5% or less in a relatively small-sized toothed belt (tooth pitch of 2.0 mm or more and 2.5 mm or less), the bendability of the belt under an extremely low temperature environment can be ensured.

In addition, by setting the hardness of the tooth portion constituted of the rubber composition to a relatively high level of 730 or more and 83° or less, it is possible to easily ensure the power-transmission performance (in particular, tooth jumping resistance) of the belt when being driven in a non-tension state.

In addition, by setting the shape of the tooth portion to an H-tooth shape (so-called round tooth shape) in which the cross-sectional shape is substantially semicircular, the maximum length (Lbt) of the tooth portion in the belt longitudinal direction passing through a portion (hereinafter, power-transmission portion) in contact with a pulley groove portion on a side surface of the tooth portion and the maximum height (Hbt) from the power-transmission portion to the tooth tip portion can both be maximized for each tooth pitch. That is, a volume of a portion contributing to power transmission per tooth can be maximized.

Therefore, as compared with the case where the tooth portion has an S-tooth shape (so-called STPD tooth shape), that is, a shape in which two side surfaces each including a convex curved surface (arc surface) bulging outward and the tooth tip portion which is a flat surface are joined together, the rigidity of the tooth portion can be increased by an amount of an increase in the volume of a portion contributing to the power transmission per tooth, and the power-transmission performance (in particular, tooth jumping resistance) of the belt in the case of being driven in a non-tension state can be easily ensured.

In addition, in the toothed belt according to the present invention, a diameter of the high-strength glass fiber filament may be 6 microns to 9 microns.

By using a high-strength glass fiber filament (strand) having a diameter of 6 microns to 9 microns as the tension member, a high-strength glass tension member having a diameter of 0.15 mm or more and less than 0.30 mm can be easily manufactured.

In addition, in the toothed belt according to the present invention, the tension member may be a single-twisted cord.

By using a single-twisted tension member, a high-strength glass tension member having a diameter of 0.15 mm or more and less than 0.30 mm can be easily manufactured.

In addition, in the toothed belt according to the present invention, in the case where the at least one tension member includes a plurality of tension members, the tension members may be embedded in the back portion so as to be arranged in a belt width direction, and
a ratio of a total value of intervals between the tension members adjacent to each other in the belt width direction to a belt width may be 20% or more and 35% or less.

By setting the ratio of the total value of the intervals between the tension members adjacent to each other in the belt width direction to the belt width to 20% or more and 35% or less, appropriate rigidity (elastic modulus) can be ensured at the back portion of the toothed belt. As a result, even in the case where the toothed belt is wound around pulleys in a non-tension state, it is possible to reliably ensure both the bendability of the toothed belt under an extremely low temperature environment and the power-transmission performance (durability, vibration resistance, tooth jumping resistance, and the like) of the toothed belt.

In addition, in the toothed belt according to the present invention, a belt elastic modulus defined by a belt tension (N) per 1 mm of a belt width with respect to a belt elongation (%) may be 30 N/% or more and less than 60 N/%.

In the case where the belt elastic modulus is within the above range, both the bendability of the belt and the power-transmission performance (in particular, impact load resistance) of the belt can be easily implemented.

In addition, in the toothed belt according to the present invention, the back portion and the tooth portion may be constituted of a rubber composition, and the rubber composition may include at least a chloroprene rubber.

According to the above configuration, a toothed belt can be manufactured using chloroprene rubber that can ensure a cold resistance and is relatively inexpensive.

In addition, in the toothed belt according to the present invention, when the toothed belt is wound around pulleys, a load of at least one of the pulleys may be 3 N·m or less.

The toothed belt can be specifically designed by setting the load of the pulleys when the toothed belt is wound around the pulleys to be 3 N·m or less (in other words, a target value of the tooth jumping torque is 3 N·m or more) converted by doubling a safety factor with respect to a driving motor torque (about 1.5 N·m) required in a driving device to be applied so as to be able to cope with the driving motor torque.

Further, in the case where the toothed belt is used within the load range, it is possible to reliably ensure the power-transmission performance (in particular, tooth jumping resistance) of the belt even in the case where the toothed belt is driven in a non-tension state.

In addition, the present invention is directed to a belt power-transmission system including:
  a driving pulley rotationally driven by a driving source;
  a driven pulley; and
  the toothed belt wound around the driving pulley and the driven pulley so that a load of the driven pulley is 3 N·m or less.

According to the belt power-transmission system, it is possible to reliably ensure the power-transmission performance of the belt while ensuring the bendability of the belt under an extremely low temperature environment even in the case where the toothed belt is wound around the driving pulley and the driven pulley in a non-tension state.

Advantageous Effects of Invention

It is possible to provide a toothed belt and a belt power-transmission system that can ensure the power-transmission performance of the belt while ensuring the bendability of the belt under an extremely low temperature environment even when being wound around pulleys in a non-tension state.

DESCRIPTION OF EMBODIMENTS

A toothed belt 1 and a belt power-transmission system 10 according to an embodiment of the present invention will be described with reference to the drawings.

(Toothed Belt 1)

Figure 1:
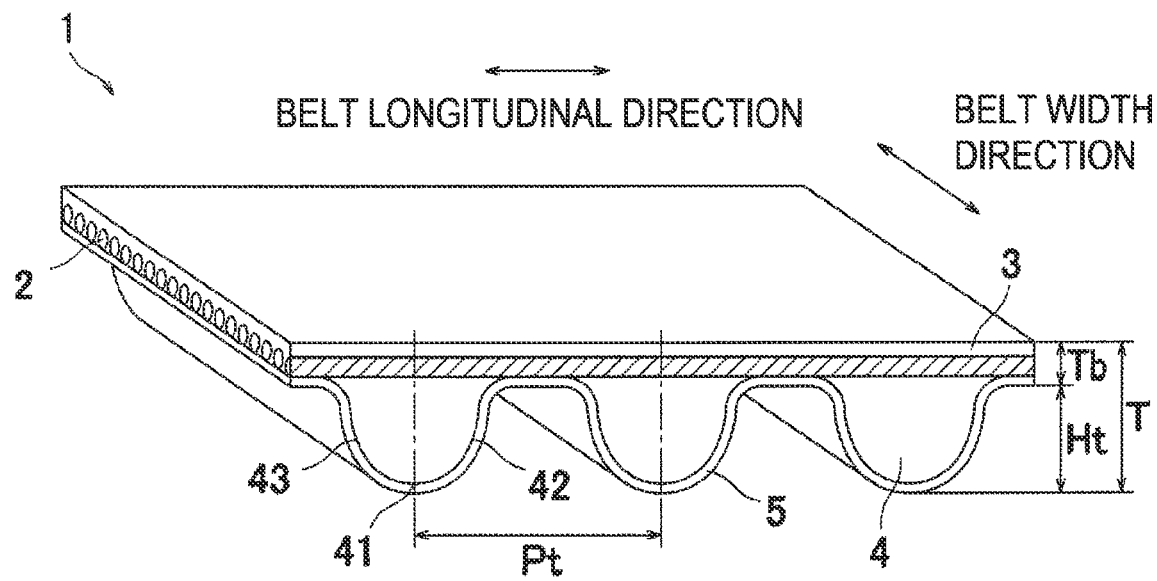
FIG. 1 is a cross-sectional perspective view of a toothed belt according to an embodiment.

As shown in FIG. 1, the toothed belt 1 includes a back portion 3 in which tension members 2 are spirally embedded along a belt longitudinal direction, and a plurality of tooth portions 4 arranged at predetermined intervals along the belt longitudinal direction on an inner peripheral surface of the back portion 3 (corresponding to one surface of the back portion 3). In the present embodiment, the plurality of tooth portions 4 are integrally formed on the inner peripheral surface of the back portion 3. In addition, the tooth portion 4 extends along a belt width direction (that is, the tooth portion 4 is a straight tooth). In addition, an inner peripheral surface of the toothed belt 1, that is, a surface of the tooth portion 4 and a part of an inner peripheral surface of the back portion 3 (portion where the tooth portion 4 is not provided) are configured (covered) by a tooth cloth 5. An outer peripheral surface of the back portion 3 (corresponding to the other surface of the back portion 3) is not covered with a cloth or the like (back cloth).

Figure 4:
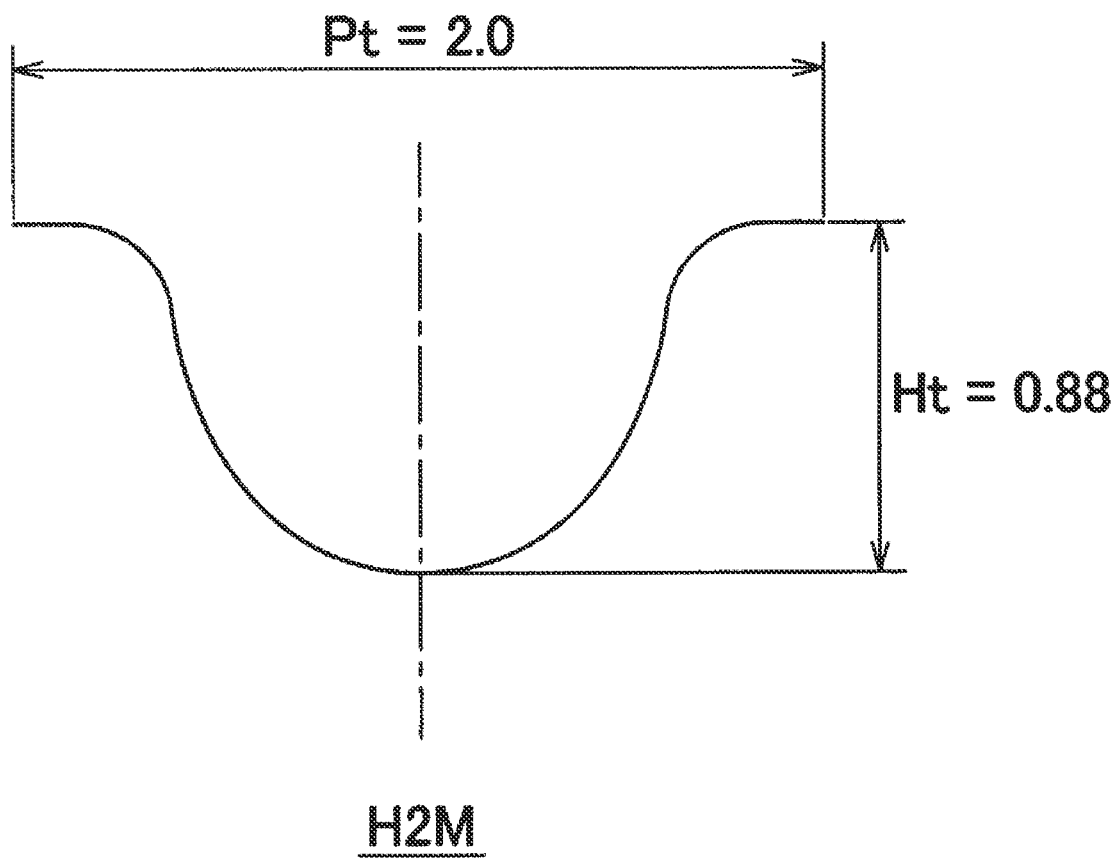
FIG. 4 is a diagram showing a tooth portion (H2M) having a tooth pitch of 2.0 mm.
Figure 5:
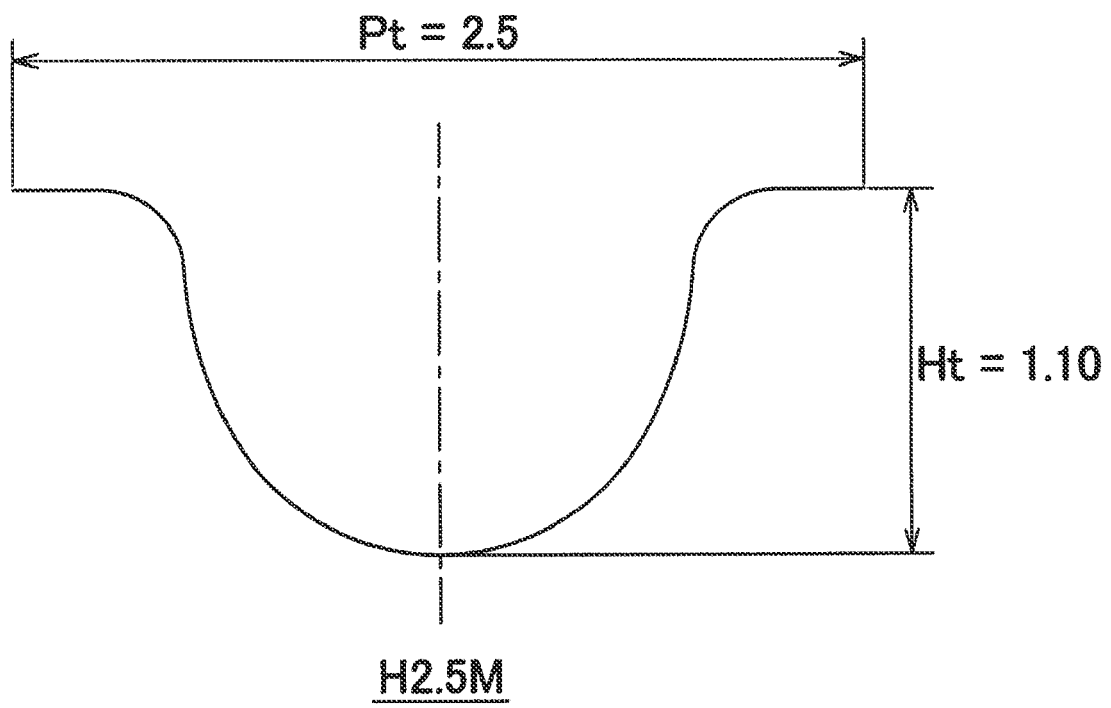
FIG. 5 is a diagram showing a tooth portion (H2.5M) having a tooth pitch of 2.5 mm.

In addition, as shown in FIG. 1, an interval (tooth pitch Pt) between the tooth portions 4 adjacent to each other in the belt longitudinal direction is 2.0 mm or more and 2.5 mm or less. A numerical value of the tooth pitch Pt also corresponds to a size of a scale of the tooth portion 4 (length of the tooth portion 4 in the belt longitudinal direction and tooth height Ht of the tooth portion 4). That is, as the tooth pitch Pt becomes larger, the scale of the tooth portion 4 becomes larger similarly. For example, FIG. 4 shows a tooth portion having a tooth pitch Pt of 2.0 mm, and FIG. 5 shows a tooth portion having a tooth pitch Pt of 2.5 mm. In the case where the tooth pitch Pt is 2.0 mm or more and 2.5 mm or less, the tooth height Ht is about 0.88 mm to 1.10 mm.

In addition, a "back thickness ratio" defined by the ratio (percentage) of a thickness Tb of the back portion 3 to a belt thickness T of the toothed belt 1 shown in FIG. 1 is 22.0% or more and 38.5% or less in the case where the tooth pitch Pt is 2.0 mm or more and 2.5 mm or less. Here, in the present invention, the "back thickness ratio" is defined and is used as an index (alternative characteristic) representing the bendability of the toothed belt.

The back thickness ratio is preferably 26.1% or more and 38.5% or less and more preferably 27.9% or more and 29.0% or less in the case where the tooth pitch Pt is 2.0 mm, and is preferably 22.0% or more and 38.5% or less and more preferably 22.0% or more and 23.6% or less in the case where the tooth pitch Pt is 2.5 mm.

For example, in the case where the tooth pitch Pt is 2.0 mm and the tooth height Ht is 0.88 mm, the thickness Tb of the back portion 3 is in a range of 0.31 mm to 0.55 mm.

In addition, in the case where the tooth pitch Pt is 2.5 mm and the tooth height Ht is 1.10 mm, the thickness Tb of the back portion 3 is in a range of 0.31 mm to 0.69 mm.

(A lower limit value of) the thickness Tb of the back portion 3 needs to be a thickness that can ensure a thickness of a portion of
  an outer peripheral side of the tension member 2 at the back portion 3 to an extent of not causing a manufacturing defect (back surface rubber chipping) (ensure the thickness of at least 0.04 mm) in consideration of a thickness of the tooth cloth 5 (for example, a thickness of 0.1 mm in a cross section of the toothed belt 1).

In addition, a length (circumferential length) of the toothed belt 1 in the belt longitudinal direction is, for example, 200 mm to 250 mm. A length (width) of the toothed belt 1 in the belt width direction is, for example, 5 mm to 15 mm.

(Back Portion 3 and Tooth Portion 4)

Each of the back portion 3 and the tooth portion 4 is constituted of a rubber composition, and as a rubber component of the rubber composition, a chloroprene rubber (CR), a nitrile rubber, a hydrogenated nitrile rubber (HNBR), ethylene-propylene copolymer (EPM), ethylene-propylene-diene ternary copolymer (EPDM), a styrene-butadiene rubber, a butyl rubber, a chlorosulfonated polyethylene rubber, or the like is used. These rubber components may be used alone or in combination. The rubber component of the rubber composition constituting each of the back portion 3 and the tooth portion 4 is preferably a polymer having a good cold resistance. In particular, a chloroprene rubber is preferable from the viewpoint of low cost. The rubber composition constituting the tooth portion 4 may be the same as the rubber composition constituting the back portion 3, and the rubber composition constituting the tooth portion 4 may be different from the rubber composition constituting the back portion 3.

The rubber composition constituting each of the back portion 3 and the tooth portion 4 may contain various commonly used additives (or compounding agents) as necessary. Examples of the additives include a vulcanizing agent or a crosslinking agent (for example, oximes (quinone dioxime and the like), guanidines (diphenylguanidine and the like), a vulcanization aid, a vulcanization accelerator, a vulcanization retardant, a reinforcing agent (silicon oxide such as carbon black, hydrous silica and the like), a metal oxide (zinc oxide, magnesium oxide, calcium oxide, barium oxide, iron oxide, copper oxide, titanium oxide, aluminum oxide and the like), a filler (clay, calcium carbonate, talc, mica and the like), a plasticizer, a softening agent (oils such as a paraffin oil, a naphthene-based oil and the like), a processing agent or a processing aid (stearic acid, metal salt of stearic acid, wax, paraffin and the like), an anti-aging agent (an aromatic amine-based anti-aging agent, a benzimidazole-based anti-aging agent and the like), a stabilizer (an antioxidant, an ultraviolet absorber, a thermal stabilizer and the like), a lubricant, a flame retardant, and an antistatic agent. These additives can be used alone or in combination, and can be selected according to the type, application, performance, and the like of the rubber component.

As the plasticizer, for example, an ether-based plasticizer, an ester-based plasticizer, an ether ester-based plasticizer, a phthalic acid-based plasticizer, an adipic acid-based plasticizer, or the like can be used. Among them, an adipic acid-based plasticizer capable of imparting flexibility to the rubber composition to an extent that there is no large difference even at an extremely low temperature from that at a normal temperature by addition of a small amount thereof is the most preferable.

A hardness of the rubber composition (tooth rubber) constituting the tooth portion 4 is 73° to 83° in hardness measured using a type A durometer at an ambient temperature of 23° C. (23±2° C.) in accordance with JIS K 6253 (2012).

(Shape of Tooth Portion 4)

Figure 3:
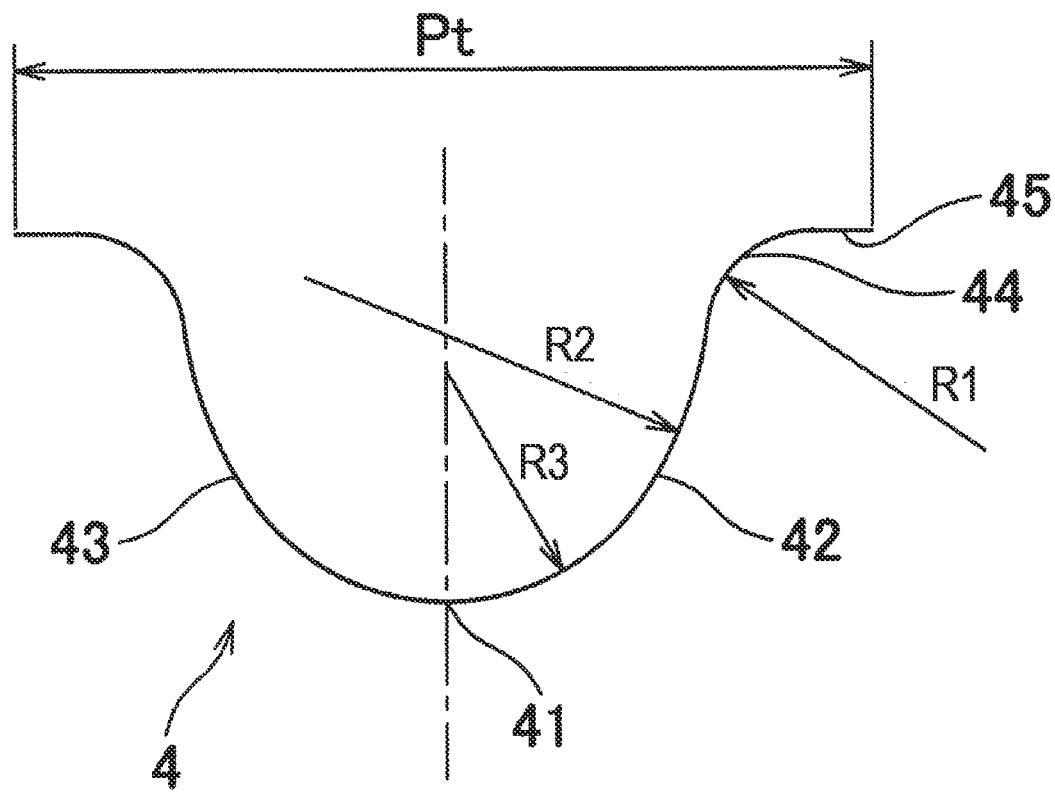
FIG. 3 is a diagram showing a tooth portion (H-tooth shape) according to an embodiment.

As shown in FIGS. 3 and 4, the tooth portion 4 has a shape in which a tooth tip portion 41 and side surfaces 42 and 43 sandwiching the tooth tip portion 41 in the belt longitudinal direction are joined together with one or two or more curved surfaces (arc surfaces) having a fixed curvature. That is, a cross-sectional shape of the tooth portion 4 including the belt longitudinal direction is a shape in which the side surface 42, the tooth tip portion 41, and the side surface 43 of the tooth portion 4 are joined together with one or two or more curves (arc lines) having a fixed curvature. Specifically, the cross-sectional shape of the tooth portion 4 is a substantially semicircular H-tooth shape (round tooth shape). The tooth portion 4 in FIG. 3 has a shape in which the tooth tip portion 41 and the side surface 42 are joined together with two curved surfaces having a curvature R2 and a curvature R3. In FIG. 3, a tooth root portion 44 of the tooth portion 4 is joined to a tooth bottom portion 45 with a curved surface having a curvature R1.

Figure 6:
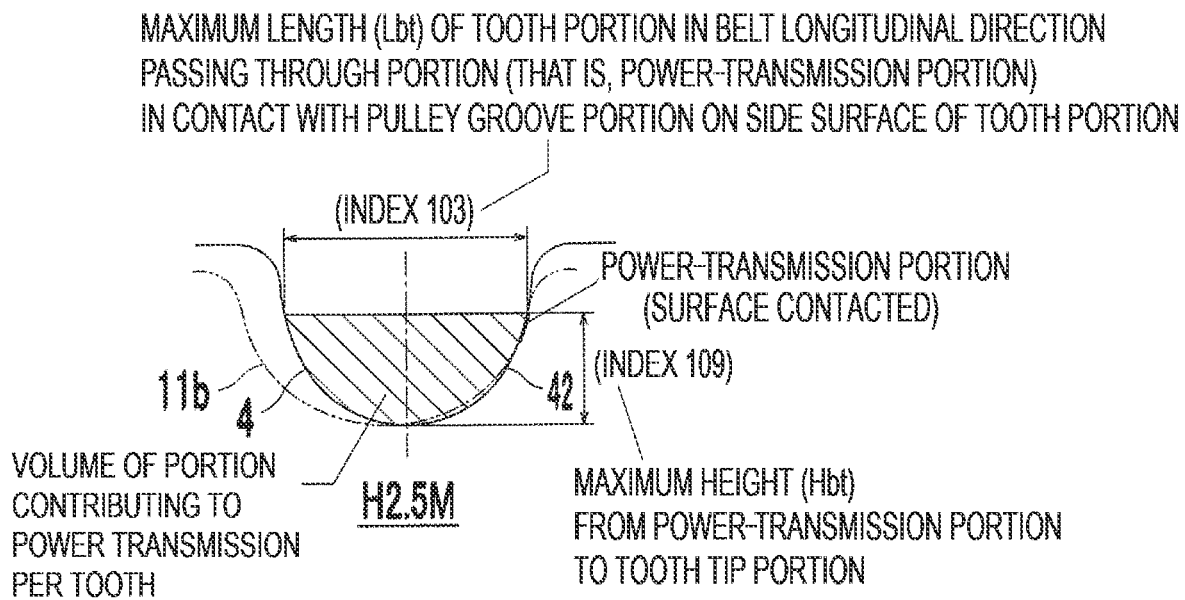
FIG. 6 is a diagram showing power-transmission performance implemented by a tooth portion of a toothed belt according to an embodiment.

Accordingly, as shown in FIGS. 3 and 6, a maximum length (Lbt) of the tooth portion 4 in the belt longitudinal direction passing through a portion (hereinafter referred to as a power-transmission portion) on the side surface 42 of the tooth portion 4 that is in contact with a pulley groove 11b of a driving pulley 11 and a pulley groove 12b of a driven pulley 12 and a maximum height (Hbt) from the power-transmission portion to the tooth tip portion 41 can be maximized for each tooth pitch Pt. That is, a volume of a portion contributing to the power transmission per tooth portion 4 can be maximized.

Figure 9:
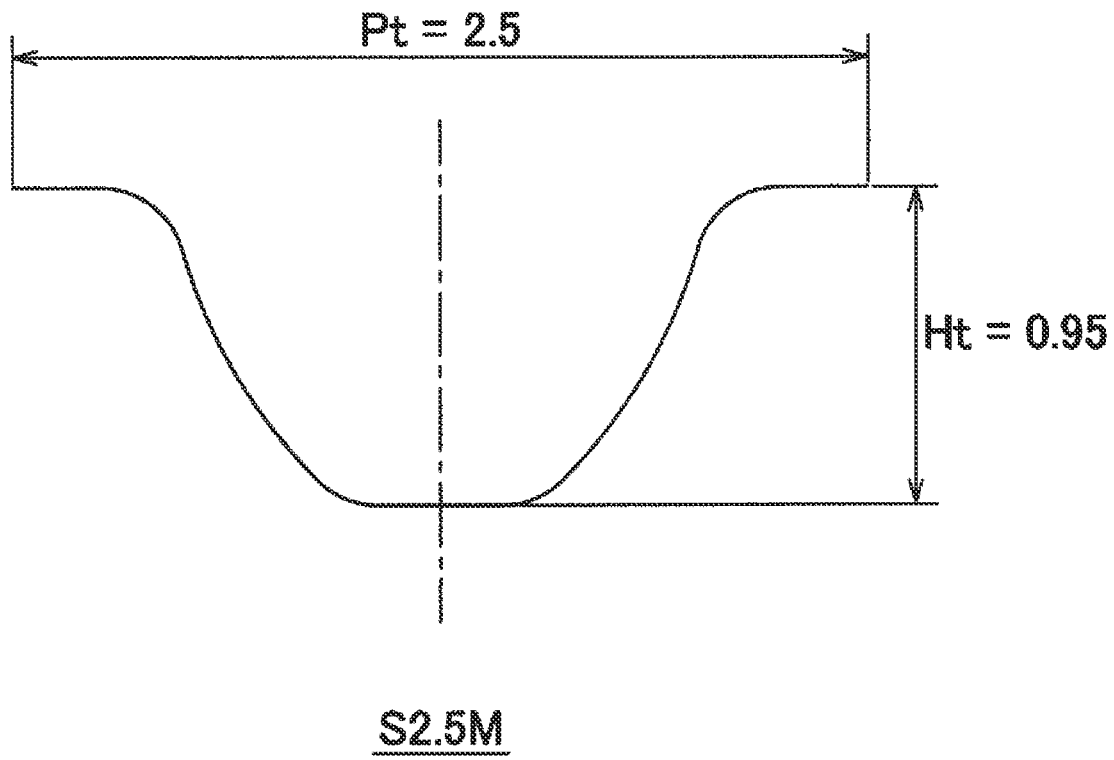
FIG. 9 is a diagram showing a tooth portion having an S-tooth shape (STPD tooth shape).
Figure 10:
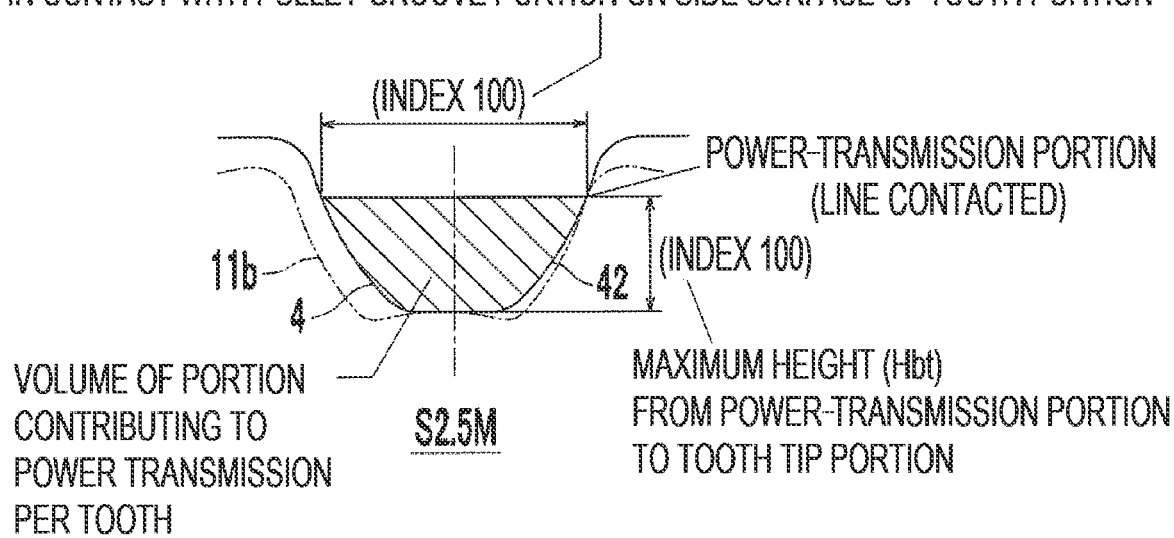
FIG. 10 is a diagram showing power-transmission performance implemented by a tooth portion of a toothed belt including the tooth portion having the S-tooth shape.

Therefore, as compared with the case where the tooth portion has an S-tooth shape (so-called STPD tooth shape) as shown in FIGS. 9 and 10, that is, a shape in which two side surfaces each including a convex curved surface (arc surface) bulging outward and the tooth tip portion which is a flat surface are joined together, the rigidity of the tooth portion 4 can be increased by an amount of an increase in a volume (hatched portion in FIG. 6) of a portion contributing to the power transmission per tooth portion 4, and the power-transmission performance (in particular, tooth jumping resistance) of the belt in the case of being driven in a non-tension state can be easily ensured.

(Tension Member 2)

The tension member 2 is constituted by a twisted cord formed by twisting a plurality of strands. One strand may be formed by bundling and aligning filaments (long fibers). A material of the filaments is a high-strength glass fiber, and a diameter of the tension member 2 is 0.15 mm or more and less than 0.30 mm. The high-strength glass fiber has a high strength, a low elongation, and is relatively inexpensive, and thus is suitable as the material of the tension member 2. A twist configuration such as a thickness of the filaments constituting the twisted cord, the number of converged filaments, the number of strands, and a twist method is not particularly limited, but in order to obtain a high-strength glass tension member having a diameter of 0.15 mm or more and less than 0.30 mm, the diameter (strand diameter) of the high-strength glass fiber filament is preferably 6 microns to 9 microns, and the twist method is preferably single-twist.

As the high-strength glass fiber, for example, a glass fiber having a tensile strength of 300 kg/cm$^2$ or more, in particular, a glass fiber containing a higher Si content than an alkali-free glass fiber (E glass fiber) and having the composition shown in Table 1 below can be suitably used. Table 1 below also shows the composition of the E glass fiber for comparison. Examples of such a high-strength glass fiber include a K glass fiber, a U glass fiber (both manufactured by Nippon Glass Fiber Co., Ltd.), a T glass fiber (manufactured by Nitto Boseki Co., Ltd.), an R glass fiber (manufactured by Vetrotex), an S glass fiber, an S-2 glass fiber, and a ZENTRON glass fiber (all manufactured by Owens Corning Fiberglass).

TABLE 1

| Component item | High-strength glass fiber | E glass fiber |
|---|---|---|
| $SiO_2$ | 58 to 70 | 52 to 56 |
| $Al_2O_3$ | 17 to 27 | 12 to 16 |
| MgO | 7 to 17 | 0 to 6 |
| CaO | 0 to 10 | 12 to 25 |
| $Na_2O$ | 0 to 2 | 0 to 0.8 |
| $K_2O$ | 0 to 2 | 8 to 13 |
| $B_2O_3$ | 0 to 2 | |
| | Containing impurities such as $Fe_2O_3$ and $TiO_2$ | |

The twisted cord used as the tension member 2 is preferably subjected to an adhesion treatment in order to enhance the adhesion to the back portion 3. As the adhesion treatment, for example, a method is adopted in which the twisted cord is immersed in a resorcin-formalin-latex treatment liquid (RFL treatment liquid) and then heated and dried to uniformly form an adhesive layer on a surface. The RFL treatment liquid is obtained by mixing an initial condensate of resorcin and formalin in latex, and examples of the latex used here include chloroprene, styrene-butadiene-vinylpyridine ternary copolymer (VP latex), hydrogenated nitrile, and NBR. Examples of the adhesion treatment include a method in which a pretreatment is performed with an epoxy or isocyanate compound, and then a treatment is performed with the RFL treatment liquid.

(Regarding Density of Tension Member Arrangement)

Figure 7:
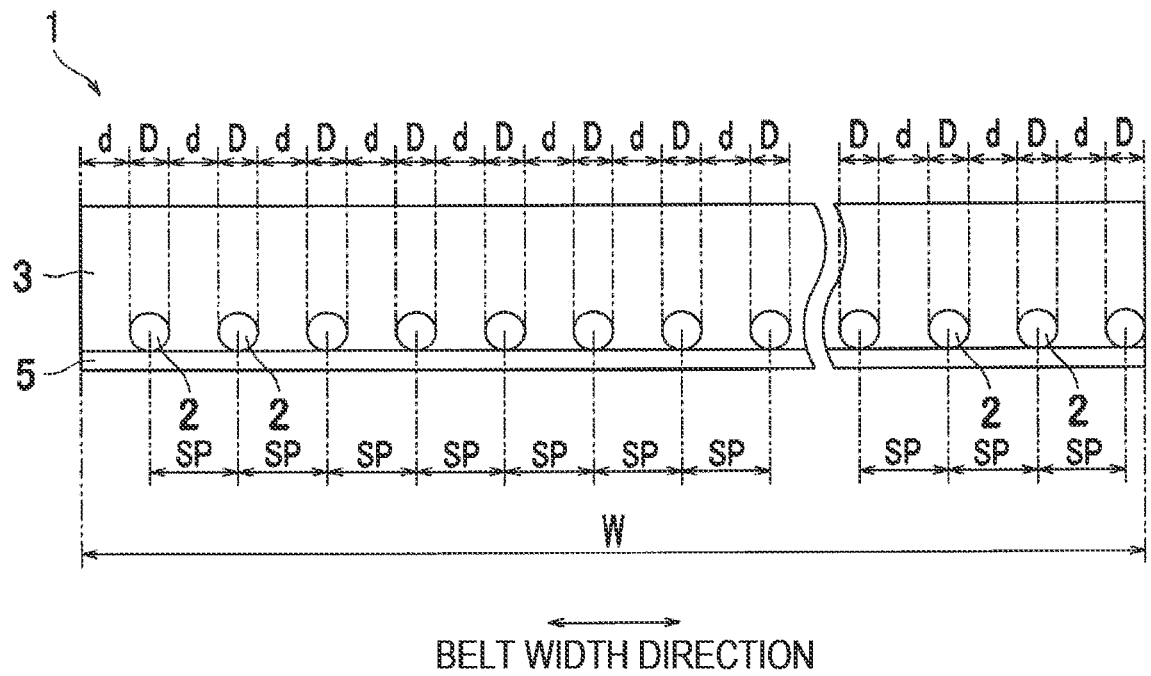
FIG. 7 is a cross-sectional view of a toothed belt according to an embodiment in a belt width direction.

The tension members 2 are spirally embedded in the back portion 3 along the belt longitudinal direction at a predetermined interval d in the belt width direction. That is, as shown in FIG. 7, the tension members 2 are arranged in the back portion 3 at a predetermined interval d in the belt width direction. More specifically, the tension members 2 are preferably embedded in the back portion 3 such that a ratio (%) of a total value of the intervals d between the tension members 2 adjacent to each other in the belt width direction to a belt width W is 20% or more and 35% or less. The total value of the intervals d between the tension members 2 adjacent to each other in the belt width direction includes intervals between an end of the toothed belt 1 and the tension member 2 (both end portions). That is, the total value of the intervals d between the tension members 2 adjacent to each other in the belt width direction is a value obtained by subtracting a value of the "total of tension member diameters D (tension member diameter D×the number of tension members)" from a value of the "belt width". Therefore, the ratio (%) of the total value of the intervals d between the tension members 2 adjacent to each other in the belt width direction to the belt width W may be replaced with a "relational expression of the tension member diameter D and the tension member pitch SP" (see "Equation 1" below). Here, as the ratio (%) of the total value of the intervals d between the tension members 2 adjacent to each other in the belt width direction to the belt width W is smaller, the interval d between the tension members 2 is smaller, and therefore, it can be said that the degree of the density of the tension member arrangement becomes dense.

In addition, as shown in FIG. 7, the tension members 2 are arranged so that each tension member pitch SP, which is a distance between centers of the tension members 2 embedded in a spiral shape, from one end of the back portion 3 to the other end thereof in the belt width direction has a fixed value. In the present description, as shown in FIG. 7, the apparent number of the tension members 2 arranged at a predetermined tension member pitch SP in the belt width direction in a cross-sectional view is treated as the "number of tension members". That is, in the case where one tension member 2 is embedded in a spiral shape, the number of spirals is the "number of tension members".

Here, it is desirable that only the number (effective number) that affects the strength (elastic modulus) of the belt is counted as the "number of tension members". Therefore, it is desirable that the number of the tension members 2 which are arranged at one end and the other end of the back portion 3 of the toothed belt in the width direction, which are cut, and which are not circular in the cross-sectional view is not included in the effective number, and the number of the tension members 2 which are not cut in the cross-sectional view is counted as the effective number.

Specifically, a value obtained by rounding down a value equal to or less than a decimal point from a calculated value obtained by dividing the belt width W by the tension member pitch SP is regarded as an approximate "number of tension members" (effective number). For example, in the case where the belt width W is 8.5 mm and the tension member pitch SP is 0.28 mm, the calculated value is 30.36, and the "number of tension members" (effective number) is regarded as 30. In addition, in the case where the belt width W is 8.5 mm and the tension member pitch SP is 0.33 mm, the calculated value is 25.76, and the "number of tension members" (effective number) is regarded as 25.

$$\begin{aligned}\text{Ratio of "Total Value of Intervals } d\text{"} \\ \text{to Belt Width}\end{aligned} = \frac{\text{"Total Value of Intervals } d\text{"}}{\text{Belt Width}} \times 100$$

$$= \frac{\text{Belt Width} - \text{"Total Value of Tension Member Diameters"}}{\text{Belt Width}} \times 100$$

$$= \frac{\text{Belt Width} - (\text{Tension Member Diameter} \times \text{Number of Tension Members})}{\text{Belt Width}} \times 100$$

$$* \text{Number of Tension Members} = \frac{\text{Belt Width}}{\text{Tension Member Pitch}}$$

$$= \frac{\text{Belt Width} - \left(\text{Tension Member Diameter} \times \frac{\text{Belt Width}}{\text{Tension Member Pitch}}\right)}{\text{Belt Width}} \times 100$$

$$= \left(1 - \frac{\text{Tension Member Diameter}}{\text{Tension Member Pitch}}\right) \times 100$$

(Tooth Cloth 5)

The tooth cloth 5 is preferably constituted of a woven fabric woven by intersecting warp yarns and weft yarns vertically and horizontally according to a certain rule. A weaving method of the woven fabric may be twill weaving, satin weaving, or the like. The warp yarn and the weft yarn may be in a form of a multifilament yarn in which filaments (long fibers) are aligned or twisted, a monofilament yarn which is one long fiber, or a spun yarn in which short fibers are twisted. In the case where the warp yarn or the weft is a multifilament yarn or a spun yarn, the warp yarn or the weft yarn may be a blend-twisted yarn or a blend-spun yarn including a plurality of types of fibers. The weft yarn preferably contains an elastic yarn having elasticity. As the elastic yarn, for example, a yarn whose material itself has elasticity, such as a spandex made of polyurethane, or a processed yarn obtained by subjecting a fiber to stretch processing (for example, woolly processing, crimping processing, or the like) is used. Generally, an elastic yarn is not used for the warp yarn. Therefore, weaving is easy. Further, the tooth cloth 5 is preferably arranged such that the warp yarn of the woven fabric extends in the belt width direction and the weft yarn extends in the belt longitudinal direction. Accordingly, the elasticity of the tooth cloth 5 in the belt longitudinal direction can be ensured. The tooth cloth 5 may be arranged so that the weft yarn of the woven fabric extends in the belt width direction and the warp yarn extends in the belt longitudinal direction. In this case, an elastic yarn having elasticity may be used as the warp yarn. As the material of the fiber constituting the tooth cloth 5, nylon, aramid, polyester, polybenzooxazole, cotton, and the like, or a combination thereof can be adopted.

The woven fabric used as the tooth cloth 5 may be subjected to an adhesion treatment in order to enhance the adhesion to the back portion 3 and the tooth portion 4. As the adhesion treatment, a method in which a woven fabric is immersed in resorcin-formalin-latex (RFL liquid) and then heated and dried to uniformly form an adhesive layer on a surface is generally used. However, without being limited thereto, a method in which a rubber composition is dissolved in an organic solvent such as methyl ethyl ketone, toluene, and xylene to form a rubber cement, and a woven fabric is immersed in the rubber cement, thereby impregnating and attaching the rubber composition can be adopted, in addition to a method in which a pretreatment is performed with an epoxy or an isocyanate compound and then a treatment is performed with the RFL liquid. These methods may be performed alone or in combination, and the processing order and the number of times of processing are not particularly limited.

(Belt Elastic Modulus)

As will be described later in detail in Examples, the "belt elastic modulus" of the toothed belt 1 defined by the belt tension (N) per 1 mm of the belt width to the belt elongation (%) is preferably 30 N/% or more and less than 60 N/% (notation example of unit of belt elastic modulus: N/%/1 mm width).

[Method for Manufacturing Toothed Belt]

The toothed belt 1 according to the present embodiment is produced by, for example, the following method (press-fitting method). First, a fiber woven fabric forming the tooth cloth 5 is wound around an outer peripheral surface of a cylindrical mold having a plurality of groove portions (recessed strips) corresponding to the tooth portions 4 of the toothed belt 1. Subsequently, a twisted cord constituting the tension member 2 is spirally wound on an outer peripheral surface of the wound fiber woven fabric at a predetermined pitch (at a predetermined pitch in an axial direction of the cylindrical mold). Further, an unvulcanized rubber sheet forming the back portion 3 and the tooth portion 4 is wound around the outer peripheral side of the wound fiber fabric to form an unvulcanized belt molded body (unvulcanized laminate).

Next, in a state in which the unvulcanized belt molded body is disposed on an outer periphery of the cylindrical mold, a rubber jacket as a vapor blocking material further covers an outer side thereof. Subsequently, the belt molded body covered with the jacket and the cylindrical mold are accommodated in a vulcanizer such as a vulcanization can. In the case where the belt molded body is heated and pressurized in the vulcanizer, the rubber composition of the unvulcanized rubber sheet and the fiber woven fabric are pressed into the groove portions (recessed strips) of the cylindrical mold to form the tooth portions 4 having a desired shape, and the rubber composition of the unvulcanized rubber sheet is vulcanized to form a sleeve-shaped vulcanized molded body (vulcanized belt sleeve) in which the rubber composition, the fiber woven fabric, and the tension member 2 are integrated. At this time, the fiber woven fabric expands in a form along a contour shape of the tooth portion 4 to form the tooth cloth 5 disposed on the surface of the tooth portion 4. Then, the vulcanized belt sleeve removed from the cylindrical mold is cut to a predetermined width, thereby obtaining a plurality of toothed belts 1. In this method (press-fitting method), the rubber composition constituting the back portion 3 is the same as the rubber composition constituting the tooth portion 4.

Alternatively, the toothed belt 1 may be produced by the following procedure by a premolding method.

First, the fiber woven fabric and the unvulcanized rubber sheet are sequentially wound around a cylindrical mold having a plurality of groove portions (recessed strips), heated and pressurized to a temperature (for example, about 70° C. to 90° C.) at which the rubber composition is softened, and the rubber composition of the unvulcanized rubber sheet and the fiber woven fabric are press-fitted into the groove portions (recessed strips) of the cylindrical mold to form the tooth portions 4, thereby obtaining a premolded body. Next, the tension member 2 is spirally wound around the outer peripheral surface of the obtained premolded body. Further, the unvulcanized rubber sheet constituting the back portion 3 is wound around the outer peripheral surface thereof to form an unvulcanized belt molded body (unvulcanized laminate).

Thereafter, a vulcanization molded body (vulcanization belt sleeve) is formed by the same procedure as the above manufacturing method. In this premolding method, since the tooth portion 4 is formed in advance before vulcanization, it is not necessary to form the tooth portion 4 by flowing or extruding unvulcanized rubber from a back portion side to a tooth portion side through gaps between the tension members 2 arranged at a predetermined pitch during vulcanization. Therefore, the distance (pitch) between adjacent tension members may be reduced. In this premolding method, the rubber composition constituting the back portion 3 may be same as the rubber composition constituting the tooth portion 4, and the rubber composition constituting the back portion 3 may be different from the rubber composition constituting the tooth portion 4. For example, in the case where the toothed belt 1 is manufactured by this premolding method using the rubber composition constituting the back portion 3 as a rubber composition in which a rubber hardness after vulcanization is lower than that of the rubber composition constituting the tooth portion 4, the rigidity of the back portion 3 may be further reduced, and the bendability of the toothed belt 1 may be further improved.

(Belt Power-Transmission System 10)

Figure 2:
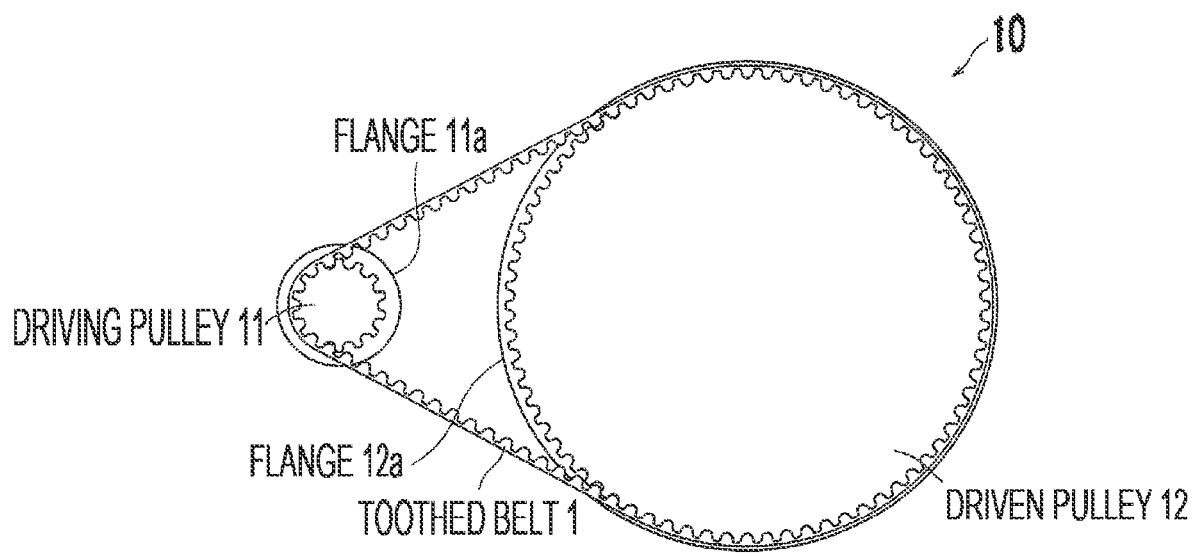
FIG. 2 is a diagram showing a belt power-transmission system according to an embodiment.

As shown in FIG. 2, the belt power-transmission system 10 mainly includes the driving pulley 11 coupled to a rotary shaft (rotatable forward and backward) of a driving motor (driving source), the driven pulley 12 coupled to a driven shaft and having a pitch diameter about five times larger than that of the driving pulley 11 so that a reduction ratio is, for example, about five and the toothed belt 1 endlessly wound between the driving pulley 11 and the driven pulley 12.

A center distance between the driving pulley 11 and the driven pulley 12 is fixed, and for example, is about 50 mm. In addition, in order to ensure the mountability of the toothed belt 1, since the toothed belt 1 is wound between the driving pulley 11 and the driven pulley 12 in a non-tension state, a slight slack occurs in the toothed belt 1 after being mounted.

Each of the driving pulley 11 and the driven pulley 12 is provided with a flange (flange 11a of the driving pulley 11 and flange 12a of the driven pulley 12) on one side of the pulley groove in the width direction in order to prevent the toothed belt 1 from coming off when being wound in a non-tension state.

The driving motor torque is about 1.5 N·m. The toothed belt 1 is designed (configured) so that the toothed belt 1 may be used with a load of the driven pulley 12 within a range of 3 N·m or less (twice of the safety factor) when being wound around the driving pulley 11 and the driven pulley 12 of the belt power-transmission system 10 in a non-tension state.

Effects of Above Configuration (High-Strength Glass Tension Member)

In the above toothed belt 1, the tension member 2 is a twisted cord containing a high-strength glass fiber. Accordingly, a belt elastic modulus of 30 N/% or more and less than 60 N/% can be ensured. As a result, both the bendability of the toothed belt 1 and the power-transmission performance (particularly, impact load resistance) of the toothed belt 1 can be implemented.

(Tooth Pitch Pt)

In addition, by setting the tooth pitch Pt of the toothed belt 1 to be 2.0 mm or more and 2.5 mm or less, it is possible to easily implement both the bendability of the belt under an extremely low temperature environment and the power-transmission performance (tooth jumping resistance and the like) even when being wound around the driving pulley 11 and the driven pulley 12 in a non-tension state.

In the case where the tooth pitch Pt is less than 2.0 mm, the scale (volume) of the tooth portion 4 becomes extremely small, the rigidity of the tooth portion 4 becomes extremely low regardless of the shape of the tooth portion 4 (even in the case where the shape of the tooth portion 4 is an H-tooth shape described later), and there is a possibility that the power-transmission performance cannot be ensured (tooth jumping and tooth chipping are likely to occur).

On the other hand, in the case where the tooth pitch Pt is more than 2.5 mm, a ratio of a belt portion (belt thinnest portion) including the tooth bottom portion 45 is excessively decreased at an engagement portion between the toothed belt 1 and the driving pulley 11 and the driven pulley 12 (wound portion of the toothed belt 1 with respect to the driving pulley 11 and the driven pulley 12), and therefore, there is a possibility that the bendability of the belt under an extremely low temperature environment cannot be ensured. In addition, it is difficult to cope with a pulley having a small diameter (driving pulley 11), and it is difficult to apply the toothed belt 1 to the belt power-transmission system 10 (belt-type speed reduction system) designed to have a relatively large speed reduction ratio (for example, speed reduction ratio of about 5).

(Diameter of Tension Member 2)

In the case where the diameter of the tension member 2 of the toothed belt 1 is 0.15 mm or more and less than 0.30 mm, the bendability of the belt under an extremely low temperature environment can be ensured.

In the case where the diameter of the tension member 2 is less than 0.15 mm (for example, in the case of a high-strength glass tension member, a filament diameter of 9 microns, single-twist having a twist configuration of 1/0, and a tension member diameter of 0.14 mm), the tension member strength is insufficient, and there is a possibility that the tension member 2 may be cut when a tension accompanied by an impact is applied to the tension member 2 in a manufacturing process of the belt, for example.

On the other hand, in the case where the diameter of the tension member 2 is 0.30 mm or more (for example, a high-strength glass tension member, a filament diameter of 9 microns, single-twist having a twist configuration of 3/0, and a tension member diameter of 0.30 mm), the flexibility of the tension member itself is inferior to that of the tension member 2 having a diameter of less than 0.30 mm, and therefore, there is a possibility that the bendability of the belt under an extremely low temperature environment cannot be ensured.

(Back Thickness Ratio)

The ratio (back thickness ratio) of the thickness Tb of the back portion 3 to the belt thickness T of the toothed belt 1 is 22.0% or more and 38.5% or less in the case where the tooth pitch Pt is 2.0 mm or more and 2.5 mm or less.

The bendability (flexibility) of the belt in the case where the toothed belt 1 having a relatively small size (tooth pitch Pt of 2.0 mm or more and 2.5 mm or less) is wound between the driving pulley 11 and the driven pulley 12 (particularly, a small-diameter pulley) in a non-tension state is related not only to the flexibility of a portion (belt thinnest portion) including the tooth bottom portion 45 but also to the ease of elastic deformation of the portion including the tooth portion 4 in a bending direction. Therefore, the "back thickness ratio" is provided as an index (alternative characteristic) representing the bendability of the belt.

By suppressing the back thickness ratio to a relatively low level of the above range (level lower than that of the belt in the related art (Patent Literatures 1 to 5)), the bendability of the belt under an extremely low temperature environment can be ensured.

It is necessary to ensure a thickness of 0.04 mm at least in the portion of the back portion 3 on the outer peripheral side of the tension member 2. In the case where the thickness is less than 0.04 mm, defects such as cracks may occur on a back surface of the manufactured belt.

In the case where the back thickness ratio is less than 22.0%, the thickness of the portion of the back portion 3 on the outer peripheral side of the tension member 2 cannot be ensured to such an extent (thickness of 0.04 mm at the minimum) that a manufacturing defect (back surface rubber chipping) is not caused even in the case where the diameter of the tension member 2 is at a lower limit level (for example, 0.17 mm) in consideration of the thickness of the tooth cloth 5 (for example, the thickness of 0.1 mm in the belt cross section), and there is a possibility that the toothed belt 1 cannot be manufactured using the tension member 2 having a diameter of 0.15 mm or more.

On the other hand, in the case where the back thickness ratio is more than 38.5%, the rigidity of the back portion 3 becomes extremely large, and there is a possibility that the bendability of the belt under an extremely low temperature environment cannot be ensured depending on the diameter of the tension member 2 and the hardness of the rubber composition constituting the back portion 3.

(Hardness of Rubber Composition Constituting Tooth Portion 4)

The portion of the tooth portion 4 excluding the tooth cloth 5 is constituted of a rubber composition, and the hardness (hardness measured using a type A durometer) of the rubber composition (tooth rubber) measured at 23° C. is 73° or more and 83° or less.

By suppressing the hardness of the tooth rubber to a relatively high level in the above range, the power-transmission performance (in particular, tooth jumping resistance) of the belt in the case of being driven in a non-tension state is easily ensured.

In the case where the rubber hardness of the tooth portion 4 at 23° C. is less than 73°, the rigidity of the tooth portion 4 becomes extremely low, and even in the case where the tooth portion 4 has an H-tooth shape (round tooth shape), there is a possibility that the power-transmission performance cannot be ensured (tooth jumping is likely to occur).

On the other hand, in the case where the rubber hardness of the tooth portion 4 at 23° C. is more than 83°, the rigidity of the back portion 3 under an extremely low temperature environment becomes extremely high depending on the diameter of the tension member 2 and the back thickness ratio in the toothed belt 1 (the rubber composition constituting the tooth portion 4 is the same as the rubber composition constituting the back portion 3) manufactured by a general method (so-called press-fitting method), and there is a possibility that the bendability of the belt under an extremely low temperature environment cannot be ensured.

(Shape of Tooth Portion 4)

The cross-sectional shape of the tooth portion 4 including the belt longitudinal direction is a shape in which the side surface 42, the tooth tip portion 41, and the side surface 43 of the tooth portion 4 are joined together with one or two or more curves (arc lines) having a fixed curvature (the shape of the tooth portion 4 is an H-tooth shape (so-called round tooth shape) shown in FIGS. 3 and 6 in which the cross-sectional shape is a substantially semicircular shape).

Accordingly, as compared with the case where the tooth portion 4 has an S-tooth shape (so-called STPD tooth shape) as shown in FIGS. 9 and 10, that is, a shape in which two side surfaces each including a convex curved surface (arc surface) bulging outward and the tooth tip portion which is a flat surface are joined together, the rigidity of the tooth portion 4 can be increased by an amount of an increase in the volume (hatched portion in FIG. 6) of a portion contributing to the power transmission per tooth portion 4, and the power-transmission performance (in particular, tooth jumping resistance) of the belt in the case of being driven in a non-tension state can be easily ensured.

(Filament Diameter of Tension Member 2)

By using a high-strength glass fiber filament (strand) having a diameter of 6 microns to 9 microns as the tension member 2, a high-strength glass tension member having a diameter of 0.15 mm or more and less than 0.30 mm can be easily produced.

(Twist Method of Tension Member 2)

By using the tension member 2 that is single-twisted, it is easy to produce a high-strength glass tension member having a diameter of 0.15 mm or more and less than 0.30 mm.

(Density of Tension Member Arrangement)

By setting the ratio (%) (density of tension member arrangement) of the total value of the intervals d between the tension members 2 adjacent to each other in the belt width direction to the belt width W to 20% or more and 35% or less, appropriate rigidity (elastic modulus) can be ensured at the back portion 3 of the toothed belt 1. As a result, even in the case where the toothed belt 1 is wound around the driving pulley 11 and the driven pulley 12 in a non-tension state, it is possible to reliably ensure both the bendability of the belt under an extremely low temperature environment and the power-transmission performance (durability, vibration resistance, tooth jumping resistance, and the like) of the belt.

In the present description, the ratio (%) of the total value of the intervals d between the tension members 2 adjacent to each other in the belt width direction to the belt width W is expressed as "density of tension member arrangement". A smaller numerical value of the density (%) of the tension member arrangement indicates a denser tension member arrangement.

In the case where the density of the tension member arrangement is less than 20%, a degree of the density of the tension member arrangement becomes extremely high, the interval d between the tension members 2 adjacent to each other becomes extremely narrow (for example, less than 0.05 mm), rubber hardly flows around the tension member at the time of manufacturing the belt, which may result in molding failure (tension member being not supported by rubber).

On the other hand, in the case where the density of the tension member arrangement is more than 35%, the degree of the density of the tension member arrangement becomes extremely sparse, and depending on the diameter of the tension member 2 (when the diameter of the tension member 2 is close to an upper limit thereof), the belt elastic modulus may be insufficient, the synchronization (meshing) power-transmission property (tooth jumping resistance) may be impaired, and there is a possibility that the durability and the vibration resistance cannot be ensured.

(Belt Elastic Modulus)

In the case where the belt elastic modulus of the toothed belt 1 defined by the belt tension (N) per 1 mm of the belt width with respect to the belt elongation (%) is 30 N/% or more and less than 60 N/%, both the bendability of the belt and the power-transmission performance (particularly, impact load resistance) of the belt are easily implemented.

In the case where the belt elastic modulus is less than 30 N/%, the impact load resistance is deteriorated. Even in the case where the toothed belt 1 is wound around the driving pulley 11 and the driven pulley 12 in a non-tension state, a belt failure such as tooth chipping (tooth portion loss) may easily occur when an impulsive load (tension) is applied to the toothed belt 1 (for example, when the slide door is vigorously and manually opened and closed). As is clear from the evaluation of Examples described later, regarding ensuring the tooth jumping resistance, it is more effective to increase the rigidity of the tooth portion 4 of the toothed belt 1 (relation between the rubber hardness of the tooth portion 4 and the shape of the tooth portion 4) than to increase the level of the belt elastic modulus in the case where the toothed belt 1 is wound around the driving pulley 11 and the driven pulley 12 in a non-tension state.

On the other hand, in the case where the belt elastic modulus is 60 N/% or more, the bending stress (bending elastic modulus) of the toothed belt 1 becomes extremely large in association with the elastic modulus (tensile elastic modulus) of the toothed belt 1, and thus there is a possibility that the bendability of the belt wound around the driving pulley 11 and the driven pulley 12 in a non-tension state in an extremely low temperature environment cannot be ensured.

(Rubber Composition)

The toothed belt 1 can be manufactured using a chloroprene rubber, which can ensure a cold resistance and is relatively inexpensive, in the case where the rubber composition constituting the back portion 3 and the tooth portion 4 contains at least the chloroprene rubber.

(Load of Driven Pulley 12)

In the belt power-transmission system 10, the load of the driven pulley 12 when the toothed belt 1 is wound around the driving pulley 11 and the driven pulley 12 is 3 N·m or less.

The toothed belt can be specifically designed by setting the load of the driven pulley 12 when the toothed belt 1 is wound around the driving pulley 11 and the driven pulley 12 to be 3 N·m or less (in other words, a target value of the tooth jumping torque of 3 N·m or less), which is obtained by doubling the safety factor with respect to a driving motor torque (about 1.5 N·m) required in the belt power-transmission system 10, so as to be able to cope with the driving motor torque.

In the case where the toothed belt 1 is used within the load range, the power-transmission performance of the belt can be reliably ensured while ensuring the bendability of the belt under an extremely low temperature environment even when being driven in a non-tension state.

EXAMPLE

In the present invention, even in the case where the toothed belt is applied to a belt power-transmission system in which the toothed belt is wound in a non-tension state, it is necessary to implement both the bendability of the toothed belt under an extremely low temperature environment (manual rotational operability of a driven pulley) and the power-transmission performance of the toothed belt (tooth jumping resistance and the like).

Therefore, in the Examples, toothed belts (hereinafter, referred to as respective test pieces) according to Examples 1 to 33 and Comparative Examples 1 to 18 were produced, measurement on the belt elastic modulus, a starting torque measurement test (−30° C. and −40° C.), and a jumping test were performed, and comparative verification was performed.

Hereinafter, the present invention will be described in more detail based on Examples, but the present invention is not limited to these Examples.

[Used Material]

(Tension Member)

Twisted cords A1 to A7 having configurations shown in Table 2 were produced as tension members of the respective test pieces.

The twisted cord A1 was produced by the following procedure. Filaments (6 micron diameter) of a glass fiber (U glass fiber) called UCDE-300 described in JIS R 3413 (2012) were bundled and aligned to form two strands. The two strands were immersed in an RFL liquid (18° C. to 23° C.) having a composition shown in the following Table 3 for 3 seconds, and then heated and dried at 200° C. to 280° C. for 3 minutes to uniformly form an adhesive layer on a surface. After the adhesion treatment, the two strands were primarily twisted at a twist number of 16 times/10 cm without secondary twisting to prepare a twisted cord having a diameter of 0.17 mm by single-twist.

The twisted cords A2 to A7 were produced in the same manner as in A1 except that the material of the filament (K glass fiber and E glass fiber other than U glass fiber), the diameter of the filament (7 micron diameter, 9 micron diameter, and 10 micron diameter other than 6 micron diameter), and the configuration of the tension member (3 strands and 1 strand other than 2 strands) were varied, thereby obtaining twisted cords having a diameter of 0.20 mm, 0.26 mm, 0.30 mm, and 0.14 mm by single-twist as shown in Table 2.

TABLE 2

|  | A1 | A2 | A3 | A4 | A5 | A6 | A7 |
|---|---|---|---|---|---|---|---|
| Material | U glass fiber | U glass fiber | U glass fiber | K glass fiber | K glass fiber | E glass fiber | K glass fiber |
| Filament diameter (μm) | 6 | 7 | 6 | 7 | 9 | 7 | 10 |
| Name of filament | UCDE-300 | UCE-225 | UCDE-300 | KCE-225 | KCG-150 | ECE-225 | KCH-150 |
| Configuration | 2/0 | 2/0 | 3/0 | 2/0 | 3/0 | 2/0 | 1/0 |
| Twist number (time/10 cm) | 16 | 16 | 16 | 16 | 16 | 16 | 16 |
| Twist method | Single-twist | Single-twist | Single-twist | Single-twist | Single-twist | Single-twist | Single-twist |
| Tension member diameter (mm) | 0.17 | 0.20 | 0.26 | 0.20 | 0.30 | 0.20 | 0.14 |

TABLE 3

|  | Part by mass |
|---|---|
| Resorcin | 1.35 |
| Formalin (solid content concentration: 37%) | 1 |
| Vinylpyridine latex (solid content concentration: 40%) | 130 |
| Water | 50 |

(Tooth Cloth)

A configuration of the fiber woven fabric used for tooth cloths of the respective test pieces was one type as follows.

A composition has 66 nylon as a weft yarn and 66 nylon as a warp yarn. In a yarn structure, the weft yarn is a woolly processed yarn having 44 dtex and the warp yarn has 44 dtex. A weaving configuration has twill weave. Then, the tooth cloth having the above configuration was subjected to an RFL treatment with the RFL treatment liquid shown in Table 3. Thereafter, an adhesion treatment was performed with a rubber cement in which the same rubber composition as that of the unvulcanized rubber sheet shown in Table 4 was dissolved in toluene, and the rubber composition sheets having the compositions shown in Table 4 were laminated and subjected to a coating treatment.
(Rubber Composition)

Each of the rubber compositions having the compositions (seven types of C1 to C7) shown in Table 4 was mixed and kneaded in a Banbury mixer, and the kneaded rubber was passed through a calendar roll to form a rolled rubber sheet having a predetermined thickness, thereby preparing an unvulcanized rubber sheet for forming a back portion and a tooth portion of each test piece.

In Table 4, components indicated by * are as follows. In addition, in each of the compositions of the rubber compositions C1 to C7 excluding C5 (cold resistance grade of H-NBR is used as the rubber component), an adipic acid-based plasticizer is added. Therefore, as can be seen from the results (see Table 4) of physical property tests (particularly, physical property tests for a low-temperature impact embrittlement temperature and a Gehman torsion test temperature) for the rubber composition described later, in the case where the rubber composition constituting the toothed belt (particularly, the back portion) is selected from the compositions of C1 to C7, the curing of the rubber composition constituting the toothed belt (particularly, the back portion) is suppressed even when being left to stand at an extremely low temperature for a long period of time, and therefore, the flexibility of the toothed belt under an extremely low temperature environment can be expected to an extent that is not significantly different from that at normal temperature (specifically, the rubber hardness at −30° C. is about +0° to +4° as compared with the rubber hardness at 23° C.).

(Physical Property Test for Rubber Composition)

After the rubber compositions of the compositions C1 to C7 were mixed and kneaded, unvulcanized rubber sheets were prepared, followed by vulcanizing at 161° C. for 25 minutes to obtain vulcanized rubber sheets. Then, predetermined test pieces to be subjected to physical property tests for the rubber composition (tests such as a rubber hardness test, a low-temperature impact embrittlement test, and a Gehman torsion test to be described later) were prepared. Each of the rubber compositions of the compositions C1 to C7 was subjected to the rubber hardness test, the low-temperature impact embrittlement test, and the Gehman torsion test as physical property tests for the rubber compositions by the following detailed methods. The test results are shown in Table 4.

(Rubber Hardness Test)

Here, the rubber hardness test for the rubber composition (vulcanized rubber sheet) was performed in accordance with JIS K 6253 (2012), and the hardness was measured at an ambient temperature of 23° C. using a type A durometer.

In the case where the rubber hardness at normal temperature is less than 73°, the rigidity of the toothed belt (particularly, the tooth portion) is excessively lowered even in an extremely low temperature environment, and a problem occurs that a predetermined tooth jumping resistance (tooth jumping torque) cannot be ensured.

On the other hand, in the case where the rubber hardness is more than 83°, the rigidity of the toothed belt (particularly, the back portion) is excessively increased even in an extremely low temperature environment, and a problem occurs that the bendability (starting torque) when the belt is wound around a pulley and the like cannot be ensured.

(Low-Temperature Impact Embrittlement Test)

The low-temperature impact embrittlement test was performed in accordance with JIS K 6261 (2006), and a low-temperature impact embrittlement temperature was

TABLE 4

| | | C1 Part by mass | C2 Part by mass | C3 Part by mass | C4 Part by mass | C5 Part by mass | C6 Part by mass | C7 Part by mass |
|---|---|---|---|---|---|---|---|---|
| Composition of rubber composition | EPDM *1 | — | — | — | — | — | 100 | — |
| | Chloroprene rubber (CR) *2 | 100 | 100 | 100 | 100 | — | — | 100 |
| | H-NBR *3 | — | — | — | — | 100 | — | — |
| | Adipic acid-based plasticizer | 8.75 | 8.75 | 8.75 | 8.75 | — | 0.5 | 8.75 |
| | Magnesium oxide | 4 | 4 | 4 | 4 | — | — | 4 |
| | Oil | — | — | — | — | — | 8 | — |
| | Stearic acid | — | — | — | — | 1 | — | — |
| | Anti-aging agent *4 | 2 | 2 | 2 | 2 | — | 2 | 2 |
| | Vulcanization accelerator *5 | 1.5 | 1.5 | 1.5 | 1.5 | 0.5 | 3.4 | 1.5 |
| | Carbon black *6 | 45 | 56 | 60 | 70 | 60 | 60 | 78 |
| | Inorganic filler | 35 | 35 | 35 | 35 | — | 5 | 35 |
| | Zinc oxide *7 | 5 | 5 | 5 | 5 | 5 | 5 | 5 |
| | Sulfur | 0.5 | 0.5 | 0.5 | 0.5 | 1.5 | 1 | 0.5 |
| | Total | 201.75 | 212.75 | 216.75 | 226.75 | 168 | 184.9 | 234.75 |
| Rubber hardness (JIS A°) | | 61 | 71 | 75 | 81 | 81 | 81 | 85 |
| Low-temperature impact embrittlement temperature (° C.) | | −42 | −42 | −42 | −42 | −56 | −60 or lower | −42 |
| Gehman torsion test temperature (° C.) | | −40 | −43 | −44 | −44 | −47 | −56 | −43 |

*1: "EPT" manufactured by Mitsui Chemical, Inc.
*2 "PM-40" manufactured by Denka Co., Ltd.
*3 "Zetpole 4310" manufactured by Zeon Corporation
*4 "Nocrac MB" manufactured by Ouchi Shinko Chemical Industrial Co., Ltd.
*5 "N-cyclohexyl-2-benzothiazole sulfenamide" manufactured by Ouchi Shinko Chemical Industrial Co., Ltd.
*6 "Seast 3" manufactured by Tokai Carbon Co., Ltd.
*7 "Zinc Oxide Third Grade" manufactured by Seido Chemical Industry Co., Ltd.

measured. The low-temperature impact embrittlement temperature indicates that as a value thereof is smaller, the flexibility can be maintained at a lower temperature, and the cold resistance (low-temperature flexibility) is improved. A sample (test piece) of the low-temperature impact embrittlement test was a strip of 40.0 mm×6.0 mm×2.0 mm.

(Gehman Torsion Test)

The Gehman torsion test was performed in accordance with JIS K 6261 (2006), and the temperature at which a torsional rigidity becomes ten times a value at 23° C., which is T10 of the Gehman torsion test was measured. The temperature of T10 of the Gehman torsion test indicates that as a value thereof is smaller, the flexibility can be maintained at a lower temperature, and the cold resistance (low-temperature flexibility) is improved.

[Manufacturing of Toothed Belt]

The respective test pieces (respective toothed belts) were produced by a normal press-fitting method described in the above embodiment using the tension members A1 to A7 (adhesion-treated products), the tooth cloths (adhesion-treated products), and the rubber compositions C1 to C7 (unvulcanized rubber sheets) described in the above used material. The vulcanization was performed at 161° C. for 25 minutes. In addition, in order to give the back portion a predetermined thickness, the back surface of the belt sleeve obtained by vulcanization was polished to a predetermined thickness and then cut to a predetermined width to obtain respective test pieces (respective toothed belts).

Since the respective test pieces (respective toothed belts) were produced by the normal press-fitting method, the back portion and the tooth portion were constituted by rubber compositions having the same composition. Therefore, in the respective test pieces (respective toothed belts), the hardness of the rubber composition constituting the back portion and the hardness of the rubber composition constituting the tooth portion are substantially the same.

External Dimensions and Shapes of Produced Toothed Belts (Test Pieces)

(Common External Dimensions and Shapes)

Belt width of 8.5 mm, belt circumferential length of about 230 mm, tooth cloth thickness (thickness in belt cross section) of 0.1 mm (Different External Dimensions and Shapes)

Tooth pitch (1.5 mm, 2.0 mm, 2.5 mm, and 3.0 mm), back thickness ratio (back portion thickness and belt thickness), tooth shape (H-tooth shape and S-tooth shape), number of teeth (153 teeth at a tooth pitch of 1.5 mm, 115 teeth at a tooth pitch of 2.0 mm, 92 teeth at a tooth pitch of 2.5 mm, and 77 teeth at a tooth pitch of 3.0 mm)

(Shape of Tooth Portion)

As shown in FIGS. 3 and 4, the shape of the tooth portion of the respective test pieces according to the present embodiment is a shape called an H-tooth shape (round tooth shape) in which the cross-sectional shape of the tooth portion is substantially semicircular. The shape of the tooth portion (shape of the cross section including the belt longitudinal direction) is a shape in which two side surfaces and a tooth tip portion of the tooth portion are joined together with two curved surfaces (arc surfaces) having a fixed curvature (R2 and R3 in FIG. 3). A tooth root portion of the tooth portion is joined to a tooth bottom portion with a curved surface having a fixed curvature (R1 in FIG. 3).

As shown in FIGS. 9 and 10, the shape of the tooth portion of the respective test pieces to be compared is a shape called an S-tooth shape (STPD tooth shape), and has a shape in which two side surfaces each formed of a curved surface (arc surface) are joined together with a flat surface. The tooth tip portion of the tooth portion is a flat surface, and both side surfaces are convex curved surfaces bulging outward. More specifically, the side surface has a shape in which two arcs are smoothly joined in the cross section including the belt longitudinal direction. The tooth root portion of the tooth portion is joined to the tooth bottom portion with a curved surface having a fixed curvature.

[Evaluation on Toothed Belt: Item, Method, Criterion]

For the respective test pieces shown in Tables 6 to 16, belt performance (belt elastic modulus, starting torque (−30° C. and −40° C.), and tooth jumping torque) was verified in order to determine whether a toothed belt capable of solving the problem of the present application was obtained.

[Belt Elastic Modulus]

(Tester)

An autograph ("AGS-J10kN" manufactured by Shimadzu Corporation) was used.

(Test Method)

A pair of pulleys (30 teeth) were attached to a lower fixing portion and an upper load cell coupling portion of the autograph, and the toothed belt was wound around the pulleys. Next, the upper pulley was raised to apply a tension (about 10 N) to such an extent that the toothed belt was not loosened. The position of the upper pulley in this state was set as an initial position, and the upper pulley was raised at a speed of 10 mm/min. In a stress-strain curve (S-S line diagram) showing a relation between the belt tension (N) and the belt elongation (%) measured at this time, a value (N/%) of the belt tension (N) with respect to the belt elongation (%) is calculated from a slope (average slope) of a straight line in a region having a relatively linear relation, and a value (N/%/1 mm width) converted per 1 mm of the belt width is defined as the belt elastic modulus (tensile elastic modulus).

(Determination Criterion)

The value of the belt elastic modulus was used as an index (in the case where the value is extremely small, the impact load resistance of the belt cannot be ensured, and in the case where the value is extremely large, the bendability of the belt cannot be ensured) for judging whether both the bendability of the belt (as a result, the manual operability of the slide door) and the power-transmission performance (in particular, the impact load resistance) of the belt were provided.

The case where the value (N/%/1 mm width) of the belt elastic modulus is 30 or more and less than 60 was evaluated that both the bendability of the toothed belt and the power-transmission performance (in particular, impact load resistance) of the toothed belt can be implemented and was determined as a.

The case where the value (N/%/1 mm width) of the belt elastic modulus was 25 or more and less than 30 was evaluated to be slightly inferior from the viewpoint of compatibility between the bendability of the toothed belt and the power-transmission performance (particularly, impact load resistance) of the toothed belt and was determined as b.

The case where the value (N/%/1 mm width) of the belt elastic modulus was less than 25 or 60 or more was evaluated that the bendability of the toothed belt and the power-transmission performance (in particular, impact load resistance) of the toothed belt cannot be implemented simultaneously and was determined as c.

From the viewpoint of suitability for actual use in this application (compatibility between the manual operability of the slide door and the impact load resistance of the belt), the belts determined as "a" or "b" were regarded as acceptable-level belts.

[Starting Torque (−30° C. and −40° C.)]
(Test Name) Starting Torque Measurement Test
(Tester)

Figure 8:
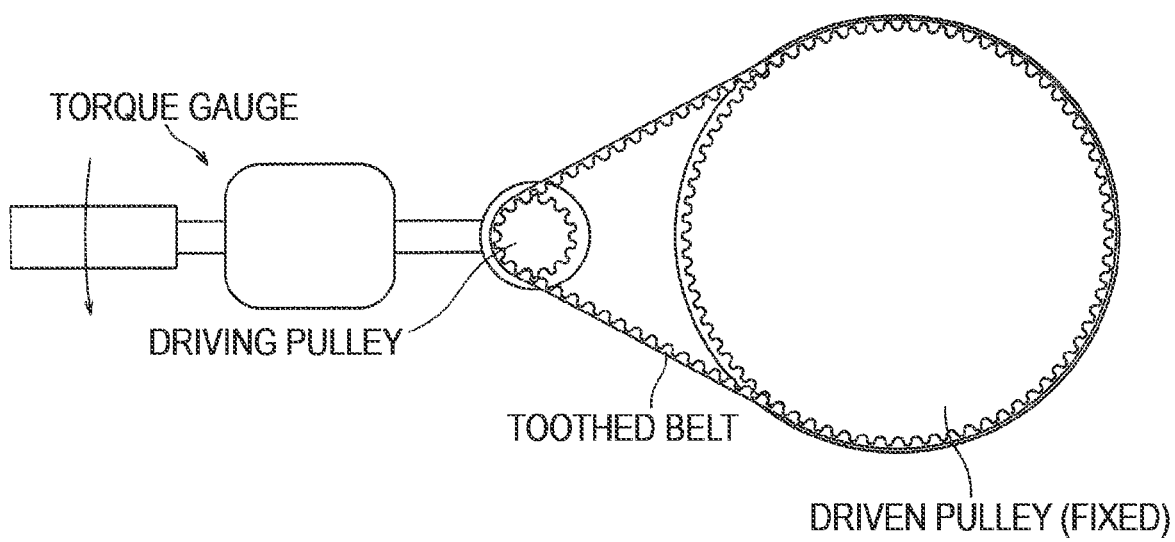
FIG. 8 is a diagram showing a biaxial torque measurement tester used in a starting torque measurement test.

Not shown (form in which torque gauges of different types are inserted into a shaft of the driven pulley in FIG. 8)

A biaxial torque measurement tester was used for the test. A pulley layout is the same as that of the above-described belt power-transmission system (FIG. 2). That is, the layout of the pulleys of the tester includes a driving pulley and a driven pulley, and a center distance is fixed at 50 mm.

(Teeth Number of Pulley)

For a toothed belt having a tooth pitch of 1.5 mm, the driving pulley had 24 teeth and the driven pulley had 108 teeth.

For a toothed belt having a tooth pitch of 2.0 mm, the driving pulley had 14 teeth and the driven pulley had 69 teeth.

For a toothed belt having a tooth pitch of 2.5 mm, the driving pulley had 15 teeth and the driven pulley had 75 teeth.

For a toothed belt having a tooth pitch of 3.0 mm, the driving pulley had 12 teeth and the driven pulley had 60 teeth.

(Test Method)

The toothed belt was wound around the pulleys (center distance being fixed) in a non-tension state (installation tensile of zero). After allowing to stand at an ambient temperature (−30° C. and −40° C.) for 90 minutes, respectively, the driven pulley was manually rotated via a torque gauge (ATG specification, manufactured by TOHNICHI CO., LTD.) connected to the shaft of the driven pulley at each ambient temperature (−30° C. and −40° C.), and the starting torque (at the start of rotation) at this time was measured. In the case where the toothed belt is excellent in bendability, the operation force (starting torque) can be suppressed low.

(Determination Criterion)

As the determination on the bendability of the belt (as a result, the manual operability of the slide door), the value of the starting torque was used as an index (as the torque value was smaller, the bendability of the belt was better), regarding the value of the starting torque at −30° C.,
the case of less than 5.0 cN·m was determined as a,
the case of 5.0 cN·m or more and less than 10.0 cN·m was determined as b, and
the case of 10.0 cN·m or more was determined as c.
Regarding the value of the starting torque at −40° C.,
the case of less than 12.4 cN·m was determined as a,
the case of 12.4 cN·m or more and less than 24.8 cN·m was determined as b, and
the case of 24.8 cN·m or more was determined as c.

From the viewpoint of suitability (manual operability of the slide door) for actual use in this application, the belts determined as "a" or "b" were regarded as acceptable-level belts.

[Tooth Jumping Torque]
(Test name) Jumping Test
(Tester)

A biaxial torque measurement tester was used for the test (see FIG. 8).

A pulley layout is the same as that of the above-described belt power-transmission system (FIG. 2). That is, the layout of the pulleys of the tester includes a driving pulley and a driven pulley, and a center distance is fixed at 50 mm.

(Teeth Number of Pulley)

For a toothed belt having a tooth pitch of 1.5 mm, the driving pulley had 24 teeth and the driven pulley had 108 teeth.

For a toothed belt having a tooth pitch of 2.0 mm, the driving pulley had 14 teeth and the driven pulley had 69 teeth.

For a toothed belt having a tooth pitch of 2.5 mm, the driving pulley had 15 teeth and the driven pulley had 75 teeth.

For a toothed belt having a tooth pitch of 3.0 mm, the driving pulley had 12 teeth and the driven pulley had 60 teeth.

(Test Method)

At normal temperature, the toothed belt was wound around the pulleys (center distance being fixed) in a non-tension state (installation tensile of zero). Then, as shown in FIG. 8, the driven pulley was fixed in advance so as not to rotate, the driving pulley was manually rotated via a torque gauge connected to a shaft of the driving pulley, and a load torque applied to the driving shaft when the tooth jumping occurred was measured as the tooth jumping torque.

(Determination Criterion)

As the determination on the tooth jumping resistance (difficulty of occurrence of tooth jumping) most important as the power-transmission performance of the belt in this application, the value of the tooth jumping torque was regarded as an index (as the torque value is larger, the tooth jumping is more difficult to occur), the case where the value of the tooth jumping torque was 3.0 N·m or more was determined as a, the case where the value of the tooth jumping torque was 2.5 N·m or more and less than 3.0 N·m was determined as b, and the case where the value of the tooth jumping torque was less than 2.5 N·m was determined as c.

From the viewpoint of suitability (tooth jumping resistance) for actual use in this application, the belts determined as "a" or "b" were regarded as acceptable-level belts.

The respective determination criteria for the test items (belt elastic modulus, starting torque (−30° C. and −40° C.), tooth jumping torque) relating to the four belt performances were summarized in Table 5.

TABLE 5

| Determination criterion | a | b | c |
|---|---|---|---|
| Belt elastic modulus (N/%/1 mm width) | 30 or more and less than 60 | 25 or more and less than 30 | Less than 25 or 60 or more |
| Starting torque (cN · m) −30° C. | Less than 5.0 | 5.0 or more and less than 10.0 | 10.0 or more |
| Starting torque (cN · m) −40° C. | Less than 12.4 | 12.4 or more and less than 24.8 | 24.8 or more |
| Tooth jumping torque (N · m) | 3.0 or more | 2.5 or more and less than 3.0 | Less than 2.5 |

(Comprehensive Determination)

The criteria of the comprehensive determination (ranking) for the toothed belt capable of solving the present problem were as follows from the results of the determination in the test items (belt elastic modulus, starting torque (−30° C. and −40° C.), tooth jumping torque) relating to the four belt performances.

Rank A: The case where all of the above test items were determined as "a" was judged that there was no problem in practical use, and was rated as the best rank.

Rank B: In the above test items, the case where the "belt elastic modulus" was determined as a, and none of the "tooth jumping torque", the "starting torque at −30° C.", and the "starting torque at −40° C." was determined as c, but even one was determined as b or the case where the "belt elastic modulus" was determined as "b" and all of the "tooth jumping torque", the "starting torque at −30° C.", and the "starting torque at −40° C." were determined as "a" has no problem in practical use but was rated as a slightly inferior rank.

Rank C: In the above test items, the case where even one was determined as "c" or the case where the "belt elastic modulus" was determined as "b", and none of the "tooth jumping torque", the "starting torque at −30° C.", and the "starting torque at −40° C." was determined as "c" but even one was determined as "b" was rated as an insufficient rank (failure) as a solution to the present problem.

(Verification Result and Consideration)

[Verification with Tooth Pitch of 2.5 mm]

The verification results are shown in Tables 6 to 12.

(Comparison in which Tension Member Diameter was Varied)

Examples 1 to 3 and Comparative Examples 1 and 2

In a toothed belt with a fixed back thickness ratio of 29.0%, rubber hardness of 750, H-tooth shape, and density of the tension member arrangement of 29.0%, using a tension member of a high-strength glass (U-glass or K-glass) fiber, the tension member diameter was varied and compared.

As the tension member diameter increased, the starting torque (−30° C. and −40° C.) tended to increase, but under these conditions, the predetermined belt elastic modulus and tooth jumping torque could be ensured (determined as a).

In the case where the tension member diameter was 0.17 mm (Example 1), 0.20 mm (Example 2), or 0.26 mm (Example 3), the starting torque (−30° C. and −40° C.) was determined as a or b (also Rank A or B in comprehensive determination), but in the case where the tension member diameter was increased to 0.30 mm (Comparative Example 1), the starting torque (−30° C. and −40° C.) was determined as c (also Rank C in the comprehensive determination).

On the other hand, in the case where the tension member diameter was reduced to 0.14 mm (Comparative Example 2), the belt could not be manufactured by cutting the tension member during manufacturing.

From the above results, it can be said that a preferable range of the tension member diameter is 0.15 mm or more and less than 0.30 mm in that a predetermined (acceptable level) starting torque can be ensured at each ambient temperature (−30° C. and −40° C.).

TABLE 6

| | | Comparative example 2 | Example 1 | Example 2 | Example 3 | Comparative example 1 |
|---|---|---|---|---|---|---|
| Tension member | Tension member type | A7 (K glass) | A1 (U glass) | A2 (U glass) | A3 (U glass) | A5 (K glass) |
| | Tension member diameter D (mm) | 0.14 | 0.17 | 0.20 | 0.26 | 0.30 |
| Rubber composition | Composition | | | C3 (CR) | | |
| | Rubber hardness (23° C.) (°) | | | 75 | | |
| Belt dimension | Tooth shape | | | H-tooth shape | | |
| | Tooth pitch Pt (mm) | | | 2.5 | | |
| | Tooth height Ht (mm) | | | 1.10 | | |
| | Back portion thickness (back thickness) Tb (mm) | | | 0.45 | | |
| | Belt thickness (total thickness) T (mm) | | | 1.55 | | |
| | Back thickness ratio (Tb/T) × 100 (%) | | | 29.0 | | |
| | Belt width W (mm) | | | 8.5 | | |
| Tension member arrangement | Tension member pitch SP (mm) | 0.20 | 0.24 | 0.28 | 0.37 | 0.42 |
| | Interval d between tension members adjacent to each other (mm) | 0.06 | 0.07 | 0.08 | 0.11 | 0.12 |
| | Ratio of total value of internal d to belt width (%) | 29.0 | 29.0 | 29.0 | 29.0 | 29.0 |
| | Effective number of tension member | 42 | 35 | 30 | 22 | 20 |
| Belt evaluation | Manufacturing of belt | Not allowed | Allowed | Allowed | Allowed | Allowed |
| | Belt elastic modulus (N/%)/1 mm width | — | 34.5 | 34.8 | 32.4 | 42.9 |
| | Determination | — | a | a | a | a |
| | Starting torque at −30° C. (cN · m) | — | 3.8 | 4.0 | 7.6 | 15.1 |
| | Determination | — | a | a | b | c |
| | Starting torque at −40° C. (cN · m) | — | 10.4 | 11.1 | 18.7 | 40.3 |
| | Determination | — | a | a | b | c |
| | Tooth jumping torque (N · m) | — | 3.1 | 3.1 | 3.1 | 3.1 |
| | Determination | — | a | a | a | a |
| Comprehensive determination (Rank) | | — | A | A | B | C |

(Comparison in which Glass Fiber (Material of Filament) was Varied)

TABLE 7

|  |  | Example 2 | Example 4 | Comparative example 3 |
|---|---|---|---|---|
| Tension member | Tension member type | A2 (U glass) | A4 (K glass) | A6 (E glass) |
|  | Tension member diameter D (mm) | | 0.20 | |
| Rubber composition | Composition | | C3 (CR) | |
|  | Rubber hardness (23° C.) (°) | | 75 | |
| Belt dimension | Tooth shape | | H-tooth shape | |
|  | Tooth pitch Pt (mm) | | 2.5 | |
|  | Tooth height Ht (mm) | | 1.10 | |
|  | Back portion thickness (back thickness) Tb (mm) | | 0.45 | |
|  | Belt thickness (total thickness) T (mm) | | 1.55 | |
|  | Back thickness ratio (Tb/T) × 100 (%) | | 29.0 | |
|  | Belt width W (mm) | | 8.5 | |
| Tension member arrangement | Tension member pitch SP (mm) | | 0.28 | |
|  | Interval d between tension members adjacent to each other (mm) | | 0.08 | |
|  | Ratio of total value of internal d to belt width (%) | | 29.0 | |
|  | Effective number of tension member | | 30 | |
| Belt evaluation | Manufacturing of belt | | Allowed | |
|  | Belt elastic modulus (N/%)/1 mm width | 34.8 | 33.8 | 29.8 |
|  | Determination | a | a | b |
|  | Starting torque at −30° C. (cN · m) | 4.0 | 3.9 | 5.0 |
|  | Determination | a | a | b |
|  | Starting torque at −40° C. (cN · m) | 11.1 | 11.0 | 12.4 |
|  | Determination | a | a | b |
|  | Tooth jumping torque (N · m) | 3.1 | 3.1 | 3.1 |
|  | Determination | a | a | a |
| Comprehensive determination (Rank) | | A | A | C |

Examples 2 and 4 and Comparative Example 3

Based on the toothed belt according to Example 2 having a tension member diameter of 0.20 mm (back thickness ratio of 29.0%, rubber hardness of 75°, H-tooth shape, density of tension member arrangement of 29.0%), the high-strength glass (U glass) fiber constituting the tension member was varied and compared.

In Example 4 in which another high-strength glass (K glass) fiber was used, the predetermined (acceptable level) belt elastic modulus could be ensured as in Example 2, and Rank A was obtained in the comprehensive determination.

On the other hand, in Comparative Example 3 in which an E glass fiber which is not a high-strength glass fiber was used, the belt elastic modulus was determined as b, the starting torque (−30° C. and −40° C.) was also determined as b, and Rank C was obtained in the comprehensive determination.

(Comparison in which Back Thickness Ratio was Varied)

TABLE 8

|  |  | Example 5 | Example 2 | Example 6 | Comparative example 4 | Example 7 | Example 1 | Example 8 |
|---|---|---|---|---|---|---|---|---|
| Tension member | Tension member type | | A2 (U glass) | | | | A1 (U glass) | |
|  | Tension member diameter D (mm) | | 0.20 | | | | 0.17 | |
| Rubber composition | Composition | | C3 (CR) | | | | C3 (CR) | |
|  | Rubber hardness (23° C.) (°) | | 75 | | | | 75 | |
| Belt dimension | Tooth shape | | H-tooth shape | | | | H-tooth shape | |
|  | Tooth pitch Pt (mm) | | 2.5 | | | | 2.5 | |
|  | Tooth height Ht (mm) | | 1.10 | | | | 1.10 | |
|  | Back portion thickness (back thickness) Tb (mm) | 0.34 | 0.45 | 0.69 | 0.30 | 0.31 | 0.45 | 0.69 |
|  | Belt thickness (total thickness) T (mm) | 1.44 | 1.55 | 1.79 | 1.40 | 1.4 | 1.55 | 1.79 |
|  | Back thickness ratio (Tb/T) × 100 (%) | 23.6 | 29.0 | 38.5 | 21.4 | 22.0 | 29.0 | 38.5 |
|  | Belt width W (mm) | | 8.5 | | | | 8.5 | |

TABLE 8-continued

|  |  |  |  |  |  |  |  |
|---|---|---|---|---|---|---|---|
| Tension member arrangement | Tension member pitch SP (mm) | 0.28 |  |  | 0.24 |  |  |
|  | Interval d between tension members adjacent to each other (mm) | 0.08 |  |  | 0.07 |  |  |
|  | Ratio of total value of internal d to belt width (%) | 29.0 |  |  | 29.0 |  |  |
|  | Effective number of tension member | 30 |  |  | 35 |  |  |
| Belt evaluation | Manufacturing of belt | Allowed |  | Not allowed | Allowed |  |  |
|  | Belt elastic modulus (N/%)/1 mm width | 34.8 | 34.8 | 34.8 | — | 34.5 | 34.5 | 34.5 |
|  | Determination | a | a | a | — | a | a | a |
|  | Starting torque at −30° C. (cN · m) | 3.7 | 4.0 | 4.6 | — | 3.4 | 3.8 | 4.4 |
|  | Determination | a | a | a | — | a | a | a |
|  | Starting torque at −40° C. (cN · m) | 10.2 | 11.1 | 12.4 | — | 9.4 | 10.4 | 11.6 |
|  | Determination | a | a | b | — | a | a | a |
|  | Tooth jumping torque (N · m) | 3.1 | 3.1 | 3.1 | — | 3.1 | 3.1 | 3.1 |
|  | Determination | a | a | a | — | a | a | a |
| Comprehensive determination (Rank) |  | A | A | B | — | A | A | A |

|  |  | Example 9 | Example 3 | Example 10 | Example 11 | Example 12 | Comparative example 5 |
|---|---|---|---|---|---|---|---|
| Tension member | Tension member type | A3 (U glass) |  |  |  |  |  |
|  | Tension member diameter D (mm) | 0.26 |  |  |  |  |  |
| Rubber composition | Composition | C3 (CR) |  |  | C4 (CR) |  |  |
|  | Rubber hardness (23° C.) (°) | 75 |  |  | 81 |  |  |
| Belt dimension | Tooth shape | H-tooth shape |  |  |  |  |  |
|  | Tooth pitch Pt (mm) | 2.5 |  |  |  |  |  |
|  | Tooth height Ht (mm) | 1.10 |  |  |  |  |  |
|  | Back portion thickness (back thickness) Tb (mm) | 0.40 | 0.45 | 0.69 | 0.69 | 0.69 | 0.70 |
|  | Belt thickness (total thickness) T (mm) | 1.50 | 1.55 | 1.79 | 1.79 | 1.79 | 1.80 |
|  | Back thickness ratio (Tb/T) × 100 (%) | 26.7 | 29.0 | 38.5 | 38.5 | 38.5 | 38.9 |
|  | Belt width W (mm) | 8.5 |  |  |  |  |  |
| Tension member arrangement | Tension member pitch SP (mm) |  | 0.37 |  |  | 0.33 |  |
|  | Interval d between tension members adjacent to each other (mm) |  | 0.11 |  |  | 0.07 |  |
|  | Ratio of total value of internal d to belt width (%) |  | 29.0 |  |  | 20.0 |  |
|  | Effective number of tension member |  | 22 |  |  | 25 |  |
| Belt evaluation | Manufacturing of belt | Allowed |  |  |  |  |  |
|  | Belt elastic modulus (N/%)/1 mm width | 32.4 | 32.4 | 32.4 | 36.8 | 36.8 | 32.4 |
|  | Determination | a | a | a | a | a | a |
|  | Starting torque at −30° C. (cN · m) | 7.4 | 7.6 | 8.7 | 9.1 | 9.9 | 10.0 |
|  | Determination | b | b | b | b | b | c |
|  | Starting torque at −40° C. (cN · m) | 18.1 | 18.7 | 20.9 | 21.9 | 24.7 | 24.8 |
|  | Determination | b | b | b | b | b | c |
|  | Tooth jumping torque (N · m) | 3.1 | 3.1 | 3.1 | 3.1 | 3.4 | 3.4 |
|  | Determination | a | a | a | a | a | c |
| Comprehensive determination (Rank) |  | B | B | B | B | B | C |

Examples 2, 5, and 6

Based on the toothed belt according to Example 2 having a tension member diameter of 0.20 mm (rubber hardness of 75°, H-tooth shape, density of tension member arrangement of 29.0%), the back thickness ratio of 29.0% was varied and compared.

As the back thickness ratio increased, the starting torque (−30° C. and −40° C.) tended to increase, but under these conditions, the predetermined belt elastic modulus and tooth jumping torque could be ensured (determined as a).

In Example 5 in which the back thickness ratio was decreased to 23.6% with respect to Example 2, Rank A was obtained as in Example 2, but in Example 6 in which the back thickness ratio was increased to 38.5%, the starting torque (−40° C.) was determined as b, and Rank B was obtained.

Examples 1, 7, and 8 and Comparative Example 4

Based on the toothed belt according to Example 1 having a tension member diameter of 0.17 mm (rubber hardness of 75°, H-tooth shape, density of tension member arrangement of 29.0%), the back thickness ratio of 29.0% was varied and compared.

In each of Example 7 in which the back thickness ratio was decreased to 22.0% and Example 8 in which the back thickness ratio was increased to 38.5% with respect to Example 1, Rank A was obtained as in Example 2.

In Comparative Example 4 in which the back thickness ratio was decreased to 21.4%, the back rubber was chipped during manufacturing of the belt, and the belt could not be manufactured. Therefore, from the viewpoint of whether the belt can be manufactured, it can be said that the lower limit level of the back thickness ratio is 22.0%.

Examples 3 and 9 to 12 and Comparative Example 5

Based on the toothed belt according to Example 3 having a tension member diameter of 0.26 mm (rubber hardness of 75°, H-tooth shape, density of tension member arrangement of 29.0%), the back thickness ratio of 29.0% was varied and compared.

With respect to Example 3, both Example 9 in which the back thickness ratio was decreased to 26.7% and Example 10 in which the back thickness ratio was increased to 38.5% were equivalent to Example 3 (Rank B).

The value of the starting torque is an index of the bendability of the belt (as the torque value is smaller, the bendability of the belt is better), but the bendability of the back portion is also affected by the back thickness ratio, the rubber hardness constituting the back portion, and the density of the tension member embedded in the back portion.

Therefore, in order to confirm the influence, Example 11 was an example in which the density of the tension member arrangement was increased to 20.0% (tension member arrangement being densified) with respect to the toothed belt according to Example 10, but was equivalent to Example 10 (Rank B). Example 12 was an example in which the rubber hardness was further increased to 81° with respect to Example 11, but was equivalent to Example 10 (Rank B). However, in Comparative Example 5 in which the back thickness ratio was increased to 38.9% under conditions of a high density (20.0%) of the tension member arrangement and a high hardness (81°) according to Example 12, the starting torque (−30° C. and −40° C.) was determined as c, and Rank C was obtained.

From this result, it can be said that the upper limit level of the back thickness ratio is 38.5% in that the predetermined (acceptable level) starting torque can be ensured at each ambient temperature (−30° C. and −40° C.).

From the above results, it can be said that a preferable range of the back thickness ratio is 22.0% or more and 38.5% or less in that it is possible to ensure the manufacturability and the predetermined starting torque.

(Comparison in which Hardness of Rubber Composition Constituting Back Portion and Tooth Portion (Rubber Hardness) is Varied)

TABLE 9

| | | Comparative example 6 | Comparative example 7 | Example 1 | Example 13 | Example 2 | Example 14 |
|---|---|---|---|---|---|---|---|
| Tension member | Tension member type | | | A1 (U glass) | | A2 (U glass) | |
| | Tension member diameter D (mm) | | | 0.17 | | 0.20 | |
| Rubber composition | Composition | C1 (CR) | C2 (CR) | C3 (CR) | C4 (CR) | C3 (CR) | C4 (CR) |
| | Rubber hardness (23° C.) (°) | 61 | 71 | 75 | 81 | 75 | 81 |
| Belt dimension | Tooth shape | | | H-tooth shape | | H-tooth shape | |
| | Tooth pitch Pt (mm) | | | 2.5 | | 2.5 | |
| | Tooth height Ht (mm) | | | 1.10 | | 1.10 | |
| | Back portion thickness (back thickness) Tb (mm) | | | 0.45 | | 0.45 | |
| | Belt thickness (total thickness) T (mm) | | | 1.55 | | 1.55 | |
| | Back thickness ratio (Tb/T) × 100 (%) | | | 29.0 | | 29.0 | |
| | Belt width W (mm) | | | 8.5 | | 8.5 | |
| Tension member arrangement | Tension member pitch SP (mm) | | | 0.24 | | 0.28 | |
| | Interval d between tension members adjacent to each other (mm) | | | 0.07 | | 0.08 | |
| | Ratio of total value of internal d to belt width (%) | | | 29.0 | | 29.0 | |
| | Effective number of tension member | | | 35 | | 30 | |

TABLE 9-continued

| Belt evaluation | Manufacturing of belt | Allowed | | | | Allowed | |
|---|---|---|---|---|---|---|---|
| | Belt elastic modulus (N/%)/1 mm width | 34.5 | 34.5 | 34.5 | 34.5 | 34.8 | 34.8 |
| | Determination | a | a | a | a | a | a |
| | Starting torque at −30° C. (cN · m) | 3.0 | 3.6 | 3.8 | 4.4 | 4.0 | 4.6 |
| | Determination | a | a | a | a | a | a |
| | Starting torque at −40° C. (cN · m) | 8.3 | 9.8 | 10.4 | 11.9 | 11.1 | 12.7 |
| | Determination | a | a | a | a | a | a |
| | Tooth jumping torque (N · m) | 2.4 | 2.4 | 3.1 | 3.4 | 3.1 | 3.4 |
| | Determination | c | c | a | a | a | a |
| Comprehensive determination (Rank) | | C | C | A | A | A | A |

| | | Example 11 | Example 12 | Comparative example 8 |
|---|---|---|---|---|
| Tension member | Tension member type | | A3 (U glass) | |
| | Tension member diameter D (mm) | | 0.26 | |
| Rubber composition | Composition | C3 (CR) | C4 (CR) | C7 (CR) |
| | Rubber hardness (23° C.) (°) | 75 | 81 | 85 |
| Belt dimension | Tooth shape | | H-tooth shape | |
| | Tooth pitch Pt (mm) | | 2.5 | |
| | Tooth height Ht (mm) | | 1.10 | |
| | Back portion thickness (back thickness) Tb (mm) | | 0.69 | |
| | Belt thickness (total thickness) T (mm) | | 1.79 | |
| | Back thickness ratio (Tb/T) × 100 (%) | | 38.5 | |
| | Belt width W (mm) | | 8.5 | |
| Tension member arrangement | Tension member pitch SP (mm) | | 0.33 | |
| | Interval d between tension members adjacent to each other (mm) | | 0.07 | |
| | Ratio of total value of internal d to belt width (%) | | 20.0 | |
| | Effective number of tension member | | 25 | |
| Belt evaluation | Manufacturing of belt | | Allowed | |
| | Belt elastic modulus (N/%)/1 mm width | 36.8 | 36.8 | 36.8 |
| | Determination | a | a | a |
| | Starting torque at −30° C. (cN · m) | 9.1 | 9.9 | 10.8 |
| | Determination | b | b | c |
| | Starting torque at −40° C. (cN · m) | 21.9 | 24.7 | 25.9 |
| | Determination | b | b | c |
| | Tooth jumping torque (N · m) | 3.1 | 3.4 | 3.6 |
| | Determination | a | a | a |
| Comprehensive determination (Rank) | | B | B | C |

Examples 2 and 14

Based on the toothed belt according to Example 2 having a tension member diameter of 0.20 mm (back thickness ratio of 29.0%, H-tooth shape, density of tension member arrangement of 29.0%), the rubber hardness of 75° was varied and compared.

Example 14 in which the rubber hardness was increased to 810° with respect to Example 2 was equivalent to Example 2 (Rank A). As the rubber hardness increased, the starting torque (−30° C. and −40° C.) and the tooth jumping torque tended to increase, but under these conditions, the predetermined belt elastic modulus, starting torque, and tooth jumping torque could be ensured (determined as a).

Examples 1 and 13 and Comparative Examples 6 and 7

In order to confirm the lower limit level of the rubber hardness, based on the toothed belt according to Example 1 (tension member diameter of 0.17 mm), the rubber hardness of 75° was varied and compared.

Example 13 in which the rubber hardness was increased to 81° with respect to Example 1 was equivalent to Example 1 (Rank A). On the other hand, in each of Comparative Example 6 (61°) and Comparative Example 7 (71°) in which the rubber hardness was decreased with respect to Example 1, the predetermined tooth jumping torque could not be ensured (determined c), and Rank C was obtained. From this result, it can be said that the lower limit level of the rubber hardness is about 73°.

Examples 11 and 12 and Comparative Example 8

In order to confirm the upper limit level of the rubber hardness, based on the toothed belt according to Example 11 (thick tension member diameter of 0.26 mm, high density of tension member arrangement of 20.0%, high back thickness ratio of 38.5%) having conditions disadvantageous for the bendability of the back portion described above, the rubber hardness of 75° was varied and compared.

Example 12 in which the rubber hardness was increased to 81° with respect to Example 11 was equivalent to Example 11 (Rank B). Further, in Comparative Example 8 in which the rubber hardness was increased to 85°, the predetermined starting torque could not be ensured (determined as c), and Rank C was obtained. From this result, it can be said that the upper limit level of the rubber hardness is about 83°.

From the above results, it can be said that a preferable range of the rubber hardness is 73° or more and 83° or less in that the predetermined tooth jumping torque and the predetermined starting torque can be ensured.

(Comparison in which Tooth Shape was Varied)

TABLE 10

|  |  | Example 2 | Comparative example 9 | Comparative example 10 |
|---|---|---|---|---|
| Tension member | Tension member type | A2 (U glass) | | |
|  | Tension member diameter D (mm) | 0.20 | | |
| Rubber composition | Composition | C3 (CR) | | C4 (CR) |
|  | Rubber hardness (23° C.) (°) | 75 | | 81 |
| Belt dimension | Tooth shape | H-tooth shape | S-tooth shape | S-tooth shape |
|  | Tooth pitch Pt (mm) | 2.5 | | |
|  | Tooth height Ht (mm) | 1.10 | 0.95 | |
|  | Back portion thickness (back thickness) Tb (mm) | 0.45 | 0.39 | |
|  | Belt thickness (total thickness) T (mm) | 1.55 | 1.34 | |
|  | Back thickness ratio (Tb/T) × 100 (%) | 29.0 | | |
|  | Belt width W (mm) | 8.5 | | |
| Tension member arrangement | Tension member pitch SP (mm) | 0.28 | | |
|  | Interval d between tension members adjacent to each other (mm) | 0.08 | | |
|  | Ratio of total value of internal d to belt width (%) | 29.0 | | |
|  | Effective number of tension member | 30 | | |
| Belt evaluation | Manufacturing of belt | Allowed | | |
|  | Belt elastic modulus (N/%)/1 mm width | 34.8 | 34.8 | 34.8 |
|  | Determination | a | a | a |
|  | Starting torque at −30° C. (cN · m) | 4.0 | 4.0 | 4.6 |
|  | Determination | a | a | a |
|  | Starting torque at −40° C. (cN · m) | 11.1 | 11.1 | 12.7 |
|  | Determination | a | a | b |
|  | Tooth jumping torque (N · m) | 3.1 | 2.2 | 2.4 |
|  | Determination | a | c | c |
| Comprehensive determination (Rank) |  | A | C | C |

Example 2 and Comparative Examples 9 and 10

Based on the toothed belt according to Example 2 (tension member diameter of 0.20 mm, back thickness ratio of 29.0%, rubber hardness of 750, density of tension member arrangement of 29.0%), the H-tooth shape was varied and compared.

In Comparative Example 9 in which the tooth shape was varied to the S-tooth shape with respect to Example 2, the predetermined (acceptable level) tooth jumping torque could not be ensured (determined as c), and Rank C was obtained. In addition, also in Comparative Example 10 in which the rubber hardness was increased to the upper limit level (81°)

with respect to Comparative Example 9 having the S-tooth shape, the predetermined tooth jumping torque could not be ensured (determined as c), and Rank C was obtained.

From the above results, it can be said that forming the tooth shape into the H-tooth shape has an effect of ensuring the predetermined tooth jumping torque even in the case where the rubber hardness is at the lower limit level (75°), and thus the H-tooth shape is preferable.

(Comparison in which Ratio (Density of Tension Member Arrangement) of Total Value of Intervals d to Belt Width was Varied)

16), or 35.0% (Example 17), and as the tension member arrangement became sparse in this manner, the belt elastic modulus and the starting torque tended to be smaller, but Rank A was obtained under these conditions. In the belt in which the density of the tension member arrangement was 38.5%, which became further sparse (Example 18), the belt elastic modulus was at a low level (determined as b), and thus Rank B was obtained.

On the other hand, regarding the lower limit level of the density of the tension member arrangement (limit level of density), in Comparative Example 11 in which the density of

TABLE 11

| | | Comparative example 11 | Example 15 | Example 2 | Example 16 | Example 17 | Example 18 |
|---|---|---|---|---|---|---|---|
| Tension member | Tension member type | | | A2 (U glass) | | | |
| | Tension member diameter D (mm) | | | 0.20 | | | |
| Rubber composition | Composition | | | C3 (CR) | | | |
| | Rubber hardness (23° C.) (°) | | | 75 | | | |
| Belt dimension | Tooth shape | | | H-tooth shape | | | |
| | Tooth pitch Pt (mm) | | | 2.5 | | | |
| | Tooth height Ht (mm) | | | 1.10 | | | |
| | Back portion thickness (back thickness) Tb (mm) | | | 0.45 | | | |
| | Belt thickness (total thickness) T (mm) | | | 1.55 | | | |
| | Back thickness ratio (Tb/T) × 100 (%) | | | 29.0 | | | |
| | Belt width W (mm) | | | 8.5 | | | |
| Tension member arrangement | Tension member pitch SP (mm) | 0.24 | 0.25 | 0.28 | 0.30 | 0.31 | 0.33 |
| | Interval d between tension members adjacent to each other (mm) | 0.04 | 0.05 | 0.08 | 0.10 | 0.11 | 0.13 |
| | Ratio of total value of internal d to belt width (%) | 16.7 | 20.0 | 29.0 | 33.3 | 35.0 | 38.5 |
| | Effective number of tension member | 35 | 34 | 30 | 28 | 27 | 25 |
| Belt evaluation | Manufacturing of belt | Not allowed | Allowed | Allowed | Allowed | Allowed | Allowed |
| | Belt elastic modulus (N/%)/1 mm width | — | 39.4 | 34.8 | 32.5 | 31.3 | 29.0 |
| | Determination | — | a | a | a | a | b |
| | Starting torque at −30° C. (cN · m) | — | 4.4 | 4.0 | 3.8 | 3.7 | 3.5 |
| | Determination | — | a | a | a | a | a |
| | Starting torque at −40° C. (cN · m) | — | 12.0 | 11.1 | 10.6 | 10.4 | 10.0 |
| | Determination | — | a | a | a | a | a |
| | Tooth jumping torque (N · m) | — | 3.1 | 3.1 | 3.1 | 3.1 | 3.1 |
| | Determination | — | a | a | a | a | a |
| Comprehensive determination (Rank) | | — | A | A | A | A | B |

Examples 2 and 15 to 18 and Comparative Example 11

Based on the toothed belt according to Example 2 (tension member diameter of 0.20 mm, back thickness ratio of 29.0%, rubber hardness of 75°, H-tooth shape), the density of the tension member arrangement of 29.0% was varied and compared.

A large numerical value (%) of the density of the tension member arrangement (ratio of the total value of the intervals d to the belt width) here indicated that the degree of the density of the tension member arrangement becomes sparse.

The density of the tension member arrangement was 20.0% (Example 15), 29.0% (Example 2), 33.3% (Example the tension member arrangement was decreased to 16.7%, the interval between the adjacent tension members was extremely small, and the rubber hardly flowed into the periphery of the tension member during the manufacturing of the belt, resulting in poor molding. Therefore, from the viewpoint of whether the belt can be manufactured, it can be said that the lower limit level of the density of the tension member arrangement is about 20.0%.

From the above results, regarding the level of the density of the tension member arrangement, it can be said that a range of 20.0% or more and 35.0% or less is preferable from the viewpoint of moldability (manufacturability) and ensuring the predetermined (acceptable level) belt elastic modulus.

(Comparison in which Type of Rubber Component was Varied)

TABLE 12

|  |  | Example 14 | Example 19 | Example 20 |
|---|---|---|---|---|
| Tension member | Tension member type | A2 (U glass) | A2 (U glass) | A2 (U glass) |
|  | Tension member diameter D (mm) | 0.20 | 0.20 | 0.20 |
| Rubber composition | Composition | C4 (CR) | C6 (EPDM) | C5 (H-NBR) |
|  | Rubber hardness (23° C.) (°) | 81 | | |
| Belt dimension | Tooth shape | H-tooth shape | | |
|  | Tooth pitch Pt (mm) | 2.5 | | |
|  | Tooth height Ht (mm) | 1.10 | | |
|  | Back portion thickness (back thickness) Tb (mm) | 0.45 | | |
|  | Belt thickness (total thickness) T (mm) | 1.55 | | |
|  | Back thickness ratio (Tb/T) × 100 (%) | 29.0 | | |
|  | Belt width W (mm) | 8.5 | | |
| Tension member arrangement | Tension member pitch SP (mm) | 0.28 | | |
|  | Interval d between tension members adjacent to each other (mm) | 0.08 | | |
|  | Ratio of total value of internal d to belt width (%) | 29.0 | | |
|  | Effective number of tension member | 30 | | |
| Belt evaluation | Manufacturing of belt | Allowed | | |
|  | Belt elastic modulus (N/%)/1 mm width | 34.8 | 34.8 | 34.8 |
|  | Determination | a | a | a |
|  | Starting torque at −30° C. (cN · m) | 4.6 | 4.3 | 4.5 |
|  | Determination | a | a | a |
|  | Starting torque at −40° C. (cN · m) | 12.7 | 11.8 | 12.5 |
|  | Determination | a | a | a |
|  | Tooth jumping torque (N · m) | 3.4 | 3.3 | 3.3 |
|  | Determination | a | a | a |
| Comprehensive determination (Rank) |  | A | A | A |

Examples 14, 19, and 20

Based on the toothed belt according to Example 14 (tension member diameter of 0.20 mm, back thickness ratio of 29.0%, rubber hardness of 81°, H-tooth shape, density of tension member arrangement of 29.0%), the rubber component was varied and compared.

In this comparison, in order to check the influence on the cold resistance of the rubber composition constituting the back portion and the tooth portion, it was verified from the viewpoint of whether the predetermined (acceptable level) starting torque was ensured even in the case where the rubber hardness of the back portion was the upper limit level (81°).

As a result, in contrast to Example 14 including CR as the rubber component, Example 19 including EPDM and Example 20 including H-NBR were equivalent to Example 14 (Rank A).

In Example 19 in which EPDM was used as the rubber component, the increased cold resistance (low-temperature flexibility) indicated a slightly lower value of the starting torque at each ambient temperature (−30° C. and −40° C.) as compared with the case where CR or H-NBR was used.

[Verification with Tooth Pitch of 2.0 mm]

The verification results are shown in Tables 13 to 15.

(Comparison in which Back Thickness Ratio was Varied)

TABLE 13

|  |  | Example 21 | Example 22 | Example 23 | Example 24 | Example 25 | Example 26 | Example 27 | Example 28 |
|---|---|---|---|---|---|---|---|---|---|
| Tension member | Tension member type | | A2 (U glass) | | | A1 (U glass) | | A3 (U glass) | |
|  | Tension member diameter D (mm) | | 0.20 | | | 0.17 | | 0.26 | |
| Rubber composition | Composition | | C3 (CR) | | | C3 (CR) | | C3 (CR) | |
|  | Rubber hardness (23° C.) (°) | | 75 | | | 75 | | 75 | |
| Belt dimension | Tooth shape | | H-tooth shape | | | H-tooth shape | | H-tooth shape | |
|  | Tooth pitch Pt (mm) | | 2.0 | | | 2.0 | | 2.0 | |
|  | Tooth height Ht (mm) | | 0.88 | | | 0.88 | | 0.88 | |
|  | Back portion thickness (back thickness) Tb (mm) | 0.34 | 0.36 | 0.55 | 0.31 | 0.36 | 0.55 | 0.40 | 0.55 |

TABLE 13-continued

| | | Example 21 | Example 22 | Example 23 | Example 24 | Example 25 | Example 26 | Example 27 | Example 28 |
|---|---|---|---|---|---|---|---|---|---|
| | Belt thickness (total thickness) T (mm) | 1.22 | 1.24 | 1.43 | 1.19 | 1.24 | 1.43 | 1.28 | 1.43 |
| | Back thickness ratio (Tb/T) × 100 (%) | 27.9 | 29.0 | 38.5 | 26.1 | 29.0 | 38.5 | 31.3 | 38.5 |
| Tension member arrangement | Belt width W (mm) | | 8.5 | | | 8.5 | | | 8.5 |
| | Tension member pitch SP (mm) | | 0.28 | | | 0.24 | | | 0.37 |
| | Interval d between tension members adjacent to each other (mm) | | 0.08 | | | 0.07 | | | 0.11 |
| | Ratio of total value of internal d to belt width (%) | | 29.0 | | | 29.0 | | | 29.0 |
| | Effective number of tension member | | 30 | | | 35 | | | 22 |
| Belt evaluation | Manufacturing of belt | | Allowed | | | Allowed | | | Allowed |
| | Belt elastic modulus (N/%)/1 mm width | 34.8 | 34.8 | 34.8 | 34.5 | 34.5 | 34.5 | 32.4 | 32.4 |
| | Determination | a | a | a | a | a | a | a | a |
| | Starting torque at −30° C. (cN · m) | 3.5 | 3.6 | 4.2 | 3.2 | 3.4 | 4.0 | 7.2 | 81 |
| | Determination | a | a | a | a | a | a | b | b |
| | Starting torque at −40° C. (cN · m) | 9.8 | 10.0 | 11.2 | 8.9 | 9.4 | 10.5 | 18.3 | 19.7 |
| | Determination | a | a | a | a | a | a | b | b |
| | Tooth jumping torque (N · m) | 2.6 | 2.5 | 2.6 | 2.6 | 2.6 | 2.6 | 2.6 | 2.6 |
| | Determination | b | b | b | b | b | b | b | b |
| Comprehensive determination (Rank) | | B | B | B | B | B | B | B | B |

Examples 21 to 23

A toothed belt having a tooth pitch of 2.5 mm corresponding to the toothed belt according to Example 2 (tension member diameter of 0.20 mm, rubber hardness of 75°, H-tooth shape, density of tension member arrangement of 29.0%, back thickness ratio of 29.0%) used as a base for verification with a tooth pitch of 2.5 mm was used as Example 22. Rank A was obtained in Example 2, but Rank B was obtained in Example 22 since the tooth jumping torque was at a low level (determined as b).

Next, the back thickness ratio of 29.0% was varied with respect to Example 22 and compared. Under these conditions, the lower limit level of the back thickness ratio at which the belt could be manufactured was 27.9%.

With respect to Example 22, in each of Example 21 in which the back thickness ratio was decreased to 27.9% (lower limit level) and Example 23 in which the back thickness ratio was increased to 38.5%, the tooth jumping torque was determined as "b" and Rank B was obtained, as in Example 22.

Examples 24 to 26

A toothed belt having a tooth pitch of 2.0 mm corresponding to the toothed belt according to Example 1 having a tooth pitch of 2.5 mm (tension member diameter of 0.17 mm, rubber hardness of 75°, H-tooth shape, density of tension member arrangement of 29.0%, back thickness ratio of 29.0%) was used as Example 25. Rank A was obtained in Example 1, but Rank B was obtained in Example 25 since the tooth jumping torque was at a low level (determined as b).

Next, the back thickness ratio of 29.0% was varied with respect to Example 25 and compared. Under these conditions, the lower limit level of the back thickness ratio at which the belt could be manufactured was 26.1%.

With respect to Example 25, the toothed belts according to Example 24 in which the back thickness ratio was decreased to 26.1% (lower limit level) and Example 26 in which the back thickness ratio was increased to 38.5% were equivalent to Example 25 (Rank B).

Examples 27 and 28

In a toothed belt having a tooth pitch of 2.0 mm and a tension member diameter of 0.26 mm, the lower limit level of the back thickness ratio at which the belt could be manufactured was 31.3%.

Therefore, a toothed belt corresponding to the toothed belt according to Example 3 having a tooth pitch of 2.5 mm (rubber hardness of 75°, H-tooth shape, density of tension member arrangement of 29.0%, back thickness ratio of 29.0%) could not be manufactured, and toothed belts having back thickness ratios of 31.3% (lower limit level) and 38.5% were used as Examples 27 and 28, respectively. In each case, the tooth jumping torque was at a low level (determined as b), and the starting torque was also at a low level (determined as b), and thus Rank B was obtained.

From the above results, in the case where the tension member diameter is in the range of 0.15 mm or more and less than 0.30 mm and the back thickness ratio is in a range of 26.1% or more and 38.5% or less in the toothed belt having the tooth pitch of 2.0 mm, the toothed belt of Rank B capable of solving the present problem was obtained.

(Comparison in which Hardness of Rubber Composition Constituting Back Portion and Tooth Portion (Rubber Hardness) is Varied)

portion, and the thickness and the density of the tension member embedded in the back portion. In consideration of the influence, the upper limit level of the rubber hardness is

TABLE 14

| | | Comparative example 12 | Example 22 | Example 29 | Example 30 | Example 31 | Comparative example 13 |
|---|---|---|---|---|---|---|---|
| Tension member | Tension member type | | A2 (U glass) | | | A3 (U glass) | |
| | Tension member diameter D (mm) | | 0.20 | | | 0.26 | |
| Rubber composition | Composition | C2 (CR) | C3 (CR) | C4 (CR) | C3 (CR) | C4 (CR) | C7 (CR) |
| | Rubber hardness (23° C.) (°) | 71 | 75 | 81 | 75 | 81 | 85 |
| Belt dimension | Tooth shape | | H-tooth shape | | | H-tooth shape | |
| | Tooth pitch Pt (mm) | | 2.0 | | | 2.0 | |
| | Tooth height Ht (mm) | | 0.88 | | | 0.88 | |
| | Back portion thickness (back thickness) Tb (mm) | | 0.36 | | | 0.55 | |
| | Belt thickness (total thickness) T (mm) | | 1.24 | | | 1.43 | |
| | Back thickness ratio (Tb/T) × 100 (%) | | 29.0 | | | 38.5 | |
| | Belt width W (mm) | | 8.5 | | | 8.5 | |
| Tension member arrangement | Tension member pitch SP (mm) | | 0.28 | | | 0.33 | |
| | Interval d between tension members adjacent to each other (mm) | | 0.08 | | | 0.07 | |
| | Ratio of total value of internal d to belt width (%) | | 29.0 | | | 20.0 | |
| | Effective number of tension member | | 30 | | | 25 | |
| Belt evaluation | Manufacturing of belt | | Allowed | | | Allowed | |
| | Belt elastic modulus (N/%)/1 mm width | 34.8 | 34.8 | 34.8 | 36.8 | 36.8 | 36.8 |
| | Determination | a | a | a | a | a | a |
| | Starting torque at −30° C. (cN · m) | 3.3 | 3.6 | 4.1 | 8.6 | 9.5 | 10.5 |
| | Determination | a | a | a | b | b | c |
| | Starting torque at −40° C. (cN · m) | 9.2 | 10.0 | 11.4 | 20.7 | 22.7 | 24.9 |
| | Determination | a | a | a | b | b | c |
| | Tooth jumping torque (N · m) | 2.2 | 2.5 | 2.8 | 2.7 | 2.9 | 3.1 |
| | Determination | c | b | b | b | b | a |
| Comprehensive determination (Rank) | | C | B | B | B | B | C |

Examples 22 and 29 and Comparative Example 12

Based on the toothed belt according to Example 22 (tension member diameter of 0.20 mm, H-tooth shape, density of tension member arrangement of 29.0%, back thickness ratio of 29.0%), the rubber hardness of 75⁰ was varied and compared.

The toothed belt according to Example 29 in which the rubber hardness was increased to 81⁰ with respect to Example 22 was equivalent to Example 22 (Rank B). On the other hand, in Comparative Example 12 in which the rubber hardness was decreased to 71°, the predetermined tooth jumping torque could not be ensured (determined as c), and Rank C was obtained.

Examples 30 and 31 and Comparative Example 13

The value of the starting torque as an index of the bendability of the belt (as the starting torque value is smaller, the bendability of the belt is better) is affected by the back thickness ratio, the rubber hardness constituting the back portion, and the thickness and the density of the tension member embedded in the back portion. In consideration of the influence, the upper limit level of the rubber hardness is confirmed in a configuration having disadvantageous conditions for the bendability of the back portion (high back thickness ratio of 38.5%, thick tension member diameter of 0.26 mm, and high density of tension member arrangement of 20.0%).

In this configuration, in each of Example 30 (rubber hardness of 75°) and Example 31 (rubber hardness of 81), the tooth jumping torque was at a low level (determined as b) and the starting torque was also at a low level (determined as b), but the toothed belt of Rank B was obtained. However, in Comparative Example 13 in which the rubber hardness was increased to 85°, the starting torque exceeded the upper limit (determined as c), and the predetermined (acceptable level) starting torque could not be ensured (Rank C).

From the above results, in the case where the rubber hardness was in a range of 73⁰ or more and 83⁰ or less also in the toothed belt having the tooth pitch of 2.0 mm, the toothed belt of Rank B capable of solving the present problem was obtained.

(Comparison in which Type of Rubber Component was Varied)

TABLE 15

|  |  | Example 29 | Example 32 | Example 33 |
|---|---|---|---|---|
| Tension member | Tension member type | A2 (U glass) | | |
|  | Tension member diameter D (mm) | 0.20 | | |
| Rubber composition | Composition | C4 (CR) | C6 (EPDM) | C5 (H-NBR) |
|  | Rubber hardness (23° C.) (°) | 81 | | |
| Belt dimension | Tooth shape | H-tooth shape | | |
|  | Tooth pitch Pt (mm) | 2.0 | | |
|  | Tooth height Ht (mm) | 0.88 | | |
|  | Back portion thickness (back thickness) Tb (mm) | 0.36 | | |
|  | Belt thickness (total thickness) T (mm) | 1.24 | | |
|  | Back thickness ratio (Tb/T) × 100 (%) | 29.0 | | |
|  | Belt width W (mm) | 8.5 | | |
| Tension member arrangement | Tension member pitch SP (mm) | 0.28 | | |
|  | Interval d between tension members adjacent to each other (mm) | 0.08 | | |
|  | Ratio of total value of internal d to belt width (%) | 29.0 | | |
|  | Effective number of tension member | 30 | | |
| Belt evaluation | Manufacturing of belt | Allowed | | |
|  | Belt elastic modulus (N/%)/1 mm width | 34.8 | 34.8 | 34.8 |
|  | Determination | a | a | a |
|  | Starting torque at −30° C. (cN · m) | 4.1 | 3.8 | 4.0 |
|  | Determination | a | a | a |
|  | Starting torque at −40° C. (cN · m) | 11.4 | 10.7 | 11.2 |
|  | Determination | a | a | a |
|  | Tooth jumping torque (N · m) | 2.8 | 2.7 | 2.7 |
|  | Determination | b | b | b |
| Comprehensive determination (Rank) | | B | B | B |

Examples 29, 32, and 33

Based on the toothed belt according to Example 29 (tension member diameter of 0.20 mm, back thickness ratio of 29.0%, rubber hardness of 81°, H-tooth shape, density of tension member arrangement of 29.0%), the rubber component was varied and compared.

In this comparison, in order to check the influence on the cold resistance of the rubber composition constituting the back portion and the tooth portion, it was verified from the viewpoint of whether the predetermined (acceptable level) starting torque was ensured even in the case where the rubber hardness of the back portion was the upper limit level (81°).

As a result, in contrast to Example 29 including CR as the rubber component, Example 32 including EPDM and Example 33 including H-NBR were equivalent to Example 29 (Rank B).

In Example 32 in which EPDM was used as the rubber component, the increased cold resistance (low-temperature flexibility) indicated a slightly lower value of the starting torque at each ambient temperature (−30° C. and −40° C.) as compared with the case where CR or H-NBR was used.

[Verification with Tooth Pitch of 1.5 mm and Tooth Pitch of 3.0 mm]

The verification results are shown in Table 16.

TABLE 16

|  |  | Comparative example 14 | Comparative example 15 | Comparative example 16 | Comparative example 17 | Comparative example 18 |
|---|---|---|---|---|---|---|
| Tension member | Tension member type | A2 (U glass) | A1 (U glass) | A2 (U glass) | A3 (U glass) | |
|  | Tension member diameter D (mm) | 0.20 | 0.17 | 0.20 | 0.26 | |
| Rubber composition | Composition | C3 (CR) | | C4 (CR) | C4 (CR) | C3 (CR) |
|  | Rubber hardness (23° C.) (°) | 75 | | 81 | 81 | 75 |
| Belt dimension | Tooth shape | H-tooth shape | | | H-tooth shape | |
|  | Tooth pitch Pt (mm) | 1.5 | | | 3.0 | |
|  | Tooth height Ht (mm) | 0.66 | | | 1.32 | |
|  | Back portion thickness (back thickness) Tb (mm) | 0.34 | | | 0.83 | |
|  | Belt thickness (total thickness) T (mm) | 1.00 | | | 2.15 | |

TABLE 16-continued

|  |  | Comparative example 14 | Comparative example 15 | Comparative example 16 | Comparative example 17 | Comparative example 18 |
|---|---|---|---|---|---|---|
|  | Back thickness ratio (Tb/T) × 100 (%) |  | 34.0 |  | 38.5 |  |
|  | Belt width W (mm) |  | 8.5 |  | 8.5 |  |
| Tension member arrangement | Tension member pitch SP (mm) | 0.28 | 0.24 | 0.28 | 0.33 |  |
|  | Interval d between tension members adjacent to each other (mm) | 0.08 | 0.07 | 0.08 | 0.07 |  |
|  | Ratio of total value of internal d to belt width (%) |  | 29.0 |  | 20.0 |  |
|  | Effective number of tension member | 30 | 35 | 30 | 25 |  |
| Belt evaluation | Manufacturing of belt | Allowed | Allowed | Allowed | Allowed | Allowed |
|  | Belt elastic modulus (N/%)/1 mm width | 34.8 | 34.5 | 34.8 | 36.8 | 36.8 |
|  | Determination | a | a | a | a | a |
|  | Starting torque at −30° C. (cN · m) | 3.2 | 3.0 | 3.6 | 11.0 | 10.1 |
|  | Determination | a | a | a | c | c |
|  | Starting torque at −40° C. (cN · m) | 9.0 | 8.5 | 10.3 | 27.4 | 24.8 |
|  | Determination | a | a | a | c | c |
|  | Tooth jumping torque (N · m) | 2.2 | 2.2 | 2.4 | 4.2 | 3.8 |
|  | Determination | c | c | c | a | a |
| Comprehensive determination (Rank) |  | C | C | C | C | C |

Comparative Examples 14 to 16

A toothed belt having a tooth pitch of 1.5 mm corresponding to the toothed belt according to Example 22 (tension member diameter of 0.20 mm, rubber hardness of 75°, H-tooth shape, density of tension member arrangement of 29.0%, back thickness ratio of 29.0%) used as a base for verification with a tooth pitch of 2.0 mm was used as Comparative Example 14. However, the back thickness ratio was set to 34.0% as the lower limit at which manufacturing was possible with a belt having a tooth pitch of 1.5 mm. In Example 22, the tooth jumping torque was determined as b, and Rank B was obtained, but in Comparative Example 14, the predetermined tooth jumping torque could not be ensured (determined as c), and Rank C was obtained.

Next, a toothed belt in which a thin tension member (tension member diameter of 0.17 mm) was adopted with respect to the toothed belt according to Comparative Example 14 was verified as Comparative Example 15, but as in Comparative Example 14, the predetermined tooth jumping torque could not be ensured (determined as c), and Rank C was obtained.

Therefore, in order to improve the rigidity of the tooth portion, a toothed belt in which the rubber hardness was increased to 81° with respect to the toothed belt according to Comparative Example 14 was verified as Comparative Example 16, but as in Comparative Example 14, the predetermined tooth jumping torque could not be ensured (determined as c), and Rank C was obtained.

From these results, it can be said that the lower limit level of the tooth pitch is 2.0 mm from the viewpoint of ensuring the predetermined (acceptable level) tooth jumping torque.

Comparative Examples 17 and 18

In the verification with the tooth pitch of 2.5 mm, in the toothed belt according to Example 12 having a configuration having disadvantageous conditions for the bendability of the back portion (high back thickness ratio of 38.5%, thick tension member diameter of 0.26 mm, high density of tension member arrangement of 20.0%, and high rubber hardness of 81°), the starting torque was large (determined as b), and Rank B was obtained. A toothed belt in which the tooth pitch was increased to 3.0 mm corresponding to the toothed belt according to Example 12 was verified as Comparative Example 17, but the starting torque became large (determined as c), and Rank C was obtained.

In addition, a toothed belt in which the rubber hardness was decreased to 75° with respect to the toothed belt according to Comparative Example 17 was verified as Comparative Example 18, but as in Comparative Example 17, the starting torque became large (determined as c), and Rank C was obtained.

From these results, it can be said that the upper limit level of the tooth pitch is 2.5 mm from the viewpoint of ensuring the predetermined (acceptable level) starting torque at each ambient temperature (−30° C. and −40° C.).

From the above results, it can be said that a preferable range of the tooth pitch is 2.0 mm or more and 2.5 mm or less from the viewpoint of ensuring both the predetermined tooth jumping torque and the predetermined starting torque.

Obtained Effects

As can be seen from Tables 6 to 16, in the toothed belts according to Examples 1 to 33, in response to Problems 1 and 2, a high-strength glass fiber was used for the tension member (material of filament) to ensure the predetermined belt elastic modulus, and the pitch of the tooth portions was designed to be relatively small (in a range of 2.0 mm or more and 2.5 mm or less) while implementing both the bendability (starting torque) of the toothed belt and the power-transmission performance (particularly, impact load resistance) of the toothed belt under an extremely low temperature environment, whereby both the bendability (starting torque) of the belt under an extremely low temperature environment and the power-transmission performance (tooth jumping torque) of the belt could be easily ensured.

In addition, in response to Problem 1, the diameter of the tension member was designed to a relatively low level (in the range of 0.15 mm or more and less than 0.30 mm) to make the tension member itself flexible, and the back thickness ratio defined by the ratio of the thickness of the back portion to the thickness of the belt was designed to a relatively low level (in the range of 22.0% or more and 38.5% or less in the case where the tooth pitch was 2.0 mm or more and 2.5 mm or less), whereby even when being wound around the pulleys in a non-tension state, the flexibility of the belt could be ensured, and the bendability (starting torque) of the belt under an extremely low temperature environment (−30° C. to −40° C.) could be ensured.

In addition, in response to Problem 2, it was found that the rubber composition constituting the tooth portion was designed to have a relatively high hardness (73° or more and 83° or less) and the shape of the tooth portion was designed to an H-tooth shape to increase the rigidity of the tooth portion, whereby the power-transmission performance (tooth jumping torque) of the belt could be ensured even when being driven in a non-tension state.

Regarding ensuring the predetermined starting torque (bendability of belt), it was found that for a toothed belt that was wound in a non-tension state, as confirmed from Table 6, the most effective way (with the largest contribution) was to reduce the level of the tension member diameter (i.e., to make the tension member itself flexible), as confirmed from Tables 8, 9, 13, and 14, it was effective to reduce the level of each of the back thickness ratio, the rubber hardness of the back portion, and the tooth pitch, and as confirmed from Table 11, it was effective (contributive) to increase the level of the density of the tension member arrangement (making the arrangement sparse) and to reduce the belt elastic modulus.

Regarding ensuring the predetermined tooth jumping torque (power-transmission performance of belt), it was found that for a toothed belt that was wound in a non-tension state, as confirmed from Table 9 (for example, comparison of Comparative Example 7, Example 1, and Example 13), Table 10 (comparison of Example 2 and Comparative Example 9), and Table 16, the most effective way (with large contribution) was to increase the rigidity of the tooth portion (the rubber hardness of the tooth portion, the shape of the tooth portion, and the tooth pitch were related), and as confirmed from Table 6 (comparison of Examples 1 to 3 and Comparative Example 1), increasing the level of the belt elastic modulus had little effect (no contribution).

Although the present invention has been described in detail with reference to specific embodiments, it is apparent to those skilled in the art that various changes and modifications can be made without departing from the spirit and scope of the present invention.

The present application is based on Japanese Patent Application No. 2021-075222 filed on Apr. 27, 2021, Japanese Patent Application No. 2021-110816 filed on Jul. 2, 2021, and Japanese Patent Application No. 2022-066929 filed on Apr. 14, 2022, and the content thereof is incorporated herein by reference.

REFERENCE SIGNS LIST

1 toothed belt
2 tension member
3 back portion
4 tooth portion
41 tooth tip portion
42 side surface of tooth portion
43 side surface of tooth portion
44 tooth root portion
5 tooth cloth
10 belt power-transmission system

The invention claimed is:

1. A toothed belt comprising:
a back portion;
at least one tension member embedded in the back portion;
a plurality of tooth portions arranged at a predetermined interval along a belt longitudinal direction on one surface of the back portion; and
a tooth cloth covering a surface of the tooth portions and a part of the one surface of the back portion, wherein
the at least one tension member is a twisted cord comprising a high-strength glass fiber filament,
a tooth pitch between the tooth portions is 2.0 mm or more and 2.5 mm or less,
a diameter of the at least one tension member is 0.15 mm or more and less than 0.30 mm,
a ratio of a thickness of the back portion to a thickness of the toothed belt is 22.0% or more and 38.5% or less,
the tooth portions are constituted of a rubber composition,
a hardness of the rubber composition at 23° C. is 73° or more and 83° or less, and
each of the tooth portions has a shape where a tooth tip portion and two side surfaces sandwiching the tooth tip portion in the belt longitudinal direction are joined together with one or two or more curved surfaces having a fixed curvature.

2. The toothed belt according to claim 1, wherein the high-strength glass fiber filament has a diameter of 6 microns to 9 microns.

3. The toothed belt according to claim 1, wherein the at least one tension member is a single-twisted cord.

4. The toothed belt according to claim 1, wherein the at least one tension member comprises a plurality of tension members,
the tension members are embedded in the back portion so as to be arranged in a belt width direction, and
a ratio of a total value of intervals between the tension members adjacent to each other in the belt width direction to a belt width is 20% or more and 35% or less.

5. The toothed belt according to claim 1, having a belt elastic modulus defined by a belt tension (N) per 1 mm of a belt width with respect to a belt elongation (%) of 30 N/% or more and less than 60 N/%.

6. The toothed belt according to claim 1, wherein the back portion and the tooth portions are constituted of a rubber composition, and
the rubber composition comprises at least a chloroprene rubber.

7. The toothed belt according to claim 1, wherein when the toothed belt is wound around pulleys, a load of at least one of the pulleys is 3 N·m or less.

8. A belt power-transmission system comprising:
a driving pulley rotationally driven by a driving source;
a driven pulley; and
the toothed belt according to claim 1 wound around the driving pulley and the driven pulley so that a load of the driven pulley is 3 N·m or less.

* * * * *